United States Patent
Davis et al.

(10) Patent No.: US 6,298,336 B1
(45) Date of Patent: Oct. 2, 2001

(54) CARD ACTIVATION AT POINT OF DISTRIBUTION

(75) Inventors: Virgil M. Davis, Los Altos; Janet T. Roth, Oakland, both of CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/216,509

(22) Filed: Dec. 18, 1998

Related U.S. Application Data

(60) Provisional application No. 60/068,196, filed on Dec. 19, 1997.

(51) Int. Cl.[7] .................................................. G06F 17/60
(52) U.S. Cl. ............................................................ 705/41
(58) Field of Search ................................. 705/1, 16, 17, 705/18, 35, 43; 380/24

(56) References Cited

U.S. PATENT DOCUMENTS

| | | | |
|---|---|---|---|
| 4,968,873 | * | 11/1990 | Dethloff et al. ...................... 235/380 |
| 4,984,270 | * | 1/1991 | LaBounty ............................... 380/24 |
| 5,325,430 | * | 6/1994 | Smyth et al. ........................... 380/4 |
| 5,350,907 | | 9/1994 | Sjöblom . |
| 5,440,108 | * | 8/1995 | Tran et al. ............................ 235/381 |
| 5,633,930 | * | 5/1997 | Davis et al. ............................ 380/24 |
| 5,650,604 | * | 7/1997 | Marcous et al. ....................... 235/379 |
| 5,696,908 | | 12/1997 | Muchlberger et al. . |
| 5,777,305 | * | 7/1998 | Smith et al. .......................... 235/380 |
| 5,868,236 | * | 2/1999 | Rademacher ......................... 194/217 |
| 5,903,633 | * | 5/1999 | Lorsch ................................. 379/114 |
| 5,907,142 | * | 5/1999 | Kelsey ................................. 235/380 |

FOREIGN PATENT DOCUMENTS

| | | |
|---|---|---|
| 0440880 | 8/1991 | (EP) . |
| 0671703 | 9/1995 | (EP) . |
| 0768628 | 4/1997 | (EP) . |
| 9101538 | 2/1991 | (WO) . |
| 97/22919 | 6/1997 | (WO) . |

OTHER PUBLICATIONS

IQ tests for smart cards; Morrall, Katherine; Bank Marketing v29n3 pp: 18–25, Mar. 1997.*
The expanding world of the smart card; Schlumberger 1996 Annual Report: Smart card, 1996.*

* cited by examiner

Primary Examiner—Eric W. Stamber
Assistant Examiner—Yehdega Retta
(74) Attorney, Agent, or Firm—Beyer Weaver & Thomas, LLP

(57) ABSTRACT

Secure activation of stored value cards at a point of distribution uses a portable activation secure application module (ASAM) within the card dispensing machine to activate each card. Each card has a standard user mode and a security user mode. In the standard user mode the card is activated and ready for use. In the security user mode the card is not active and cannot be used to make a purchase. An issuer supplies an issuer activation key to a card supplier who produces a security code which is stored on a stored value card. Cards are supplied to the issuer in security user mode, and stored in a dispensing machine. The issuer activation key is also relayed to the dispensing machine and stored on the ASAM. Upon purchase by a customer, the issuer activation key is used within the machine by the ASAM to reproduce the security code and to activate a card. An activation control counter (ACC) is stored within the ASAM and is decremented for every attempt at activation of a card. ASAMs are maintained in the field using a dial-up connection to a central computer with a control secure application module (CSAM), or using a field secure application module (FSAM) that is created at a central location using the CSAM. Each FSAM is able to update a limited number of ASAMs. A hierarchy of keys is used by the CSAM, the FSAMs and ASAMs to ensure security.

25 Claims, 14 Drawing Sheets

ASAM CREATION AND MAINTENANCE

FIELD ASAM MAINTENANCE

FSAM Key Hierarchy

CARD ACTIVATION AT POINT OF DISTRIBUTION

This application claims priority of U.S. provisional patent application No. 60/068,196, filed Dec. 19, 1997, entitled "Card Activation At Point Of Distribution," which is hereby incorporated by reference.

FIELD OF THE INVENTION

The present invention relates generally to smart cards. More specifically, the present invention relates to a technique for activating smart cards at a point of distribution or some time thereafter.

BACKGROUND OF THE INVENTION

Smart cards that have the ability to store value within memory on the card are often referred to as "stored value cards". Stored value cards may be either disposable or reloadable. Disposable stored value cards in particular are subject to theft because of the value they hold. Once a disposable card has been loaded with value it can be used as cash in many locations; therefore, there is a concern that the cards would be stolen once they are loaded with value.

In one scenario, cards are loaded with value and personalized by a card supplier. Once personalized and loaded with value they are "live" and are vulnerable from theft from that point on. For example, these cards are vulnerable to theft during shipment from the supplier to the issuer, while being stored at an issuer location, while present in a card dispensing machine, or at any other time before the cards are legitimately sold to a customer. If cards are sold over-the-counter rather than in a machine, they are also at risk of theft before being sold. Previous techniques to combat card theft are both expensive and time consuming.

Many card suppliers and issuers rely upon insurance to cover the costs of stolen cards. This additional insurance against card theft can be expensive and is a cost a card issuer would rather do without. To directly prevent card theft, physical security techniques have been used to protect loaded stored value cards from being stolen. For example, loaded cards might be transported in armored trucks, stored in locked vaults, etc., while making their way from a card supplier to an issuer and eventually to a legitimate customer. The costs associated with this secure transport and storage can be quite high. Further increasing these costs is the fact that there are relatively few card manufacturers in existence. Thus, loaded cards must often be transported long distances (overseas or across continents) before reaching a final region for distribution. Aside from the direct costs for the secure equipment needed to transport these cards, there are also costs associated with the manpower needed to guard these cards while being transported or stored.

While loaded stored value cards may be sold over-the-counter by an entity instead of being sold in a card dispensing machine, the control and inventory issues with over-the-counter sales can also be quite expensive. Selling cards from a machine would appear to be a cleaner and simpler solution, although expensive, secure machines are required for stored value cards that are already loaded with value. Moreover, a card dispensing machine holding hundreds of stored value cards is a temptation for a thief as each card may hold hundreds of dollars worth of value. In certain countries, stored value cards for use in telephones are sold openly on the street in machines that are particularly prone to theft.

Therefore, a technique is desirable that would not only help prevent the theft of stored value cards, but also would minimize the loss to an issuer should a card be stolen. It would further be desirable for such a technique to reduce the costs associated with stored value card security.

SUMMARY OF THE INVENTION

To achieve the foregoing, and in accordance with the purpose of the present invention, a system for the secure activation of stored value cards at a point of distribution to customers is disclosed that provides greater security for stored value cards and reduces the costs associated with protecting these cards.

In one embodiment of the invention, each card has a standard user mode and a security user mode. In the standard user mode the card is activated and ready for use. In the security user mode the card is not active and cannot be used in a payment terminal to make a purchase. Cards are personalized by a card supplier in either the standard user mode or in the security user mode. If shipped by the card supplier in the security user mode, the card cannot be used until it is legitimately activated in a card dispensing machine immediately prior to its sale to a purchasing customer. Advantageously, if cards are lost or stolen during any point in the transport or storage before they are activated, the card cannot be used and no loss in value occurs.

In a particular embodiment of the invention, a security code must be presented to the card before the card becomes activated. Advantageously, the security code is generated in a secure manner by a card dispensing machine or other device only under authorization by an issuer prior to the sale of the card to a customer. It is believed that cost savings per card using this technique is between $0.05 and $0.75 per card.

In another embodiment of the invention, an activation control counter (ACC) is stored within an activation secure application module (ASAM) within the card dispensing machine. The ACC is decremented for every attempt at activation of a card, successful or otherwise. The ACC limits exposure to fraud and to theft by limiting the number of times that cards may be attempted to be activated.

In a further embodiment, ASAMs are maintained in the field (i.e., within card dispensing machines) obviating the need to return an ASAM to a central location for maintenance, or the need to bring a computer to a dispensing machine. A field secure application module (FSAM) is created at the activation manager and is able to update a limited number of ASAMs. Preferably, a hierarchy of keys is used within a control secure application module (CSAM), the FSAMs and ASAMs to ensure security.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

SMART CARD BACKGROUND

Figure 1:
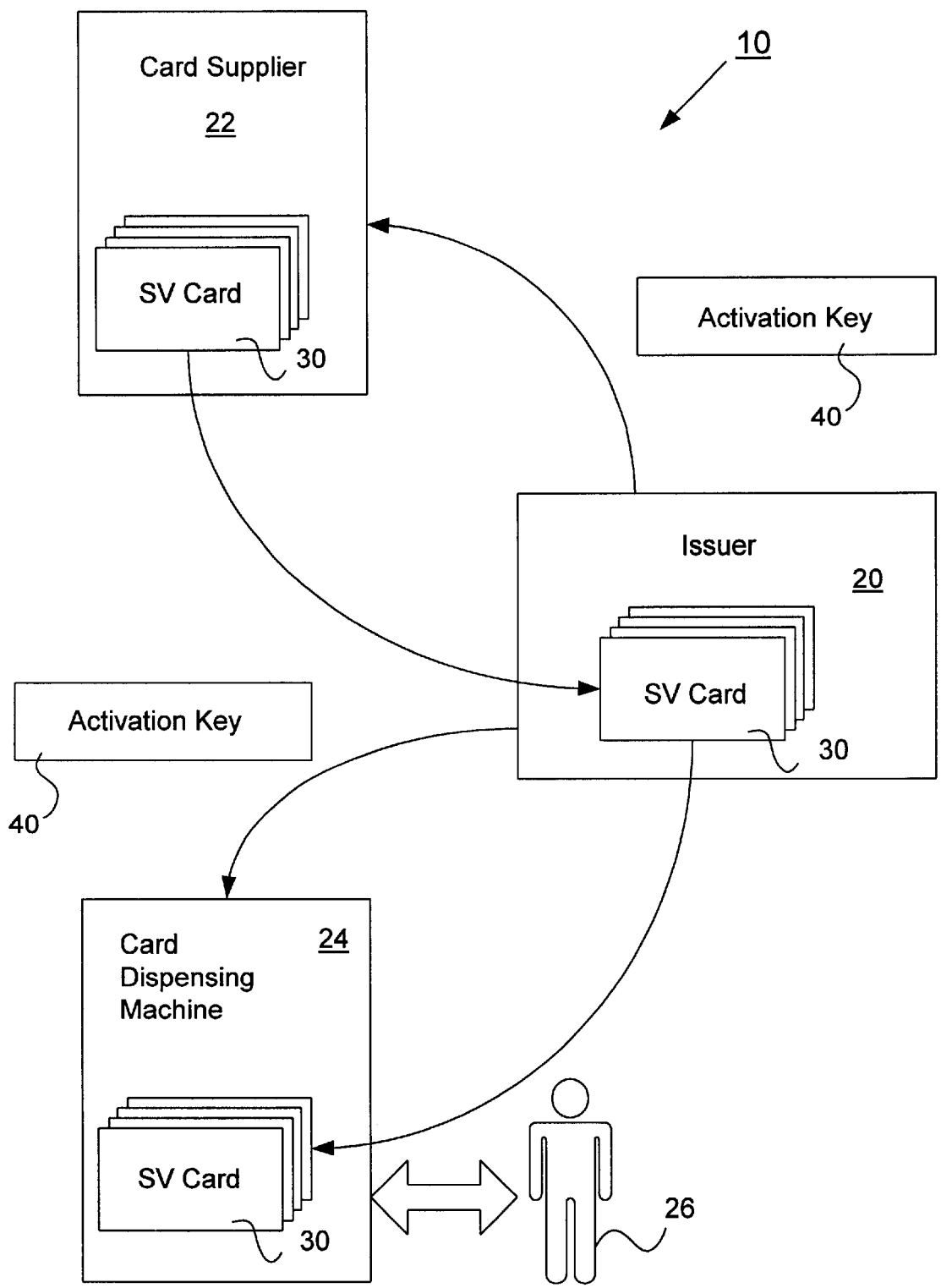
FIG. 1 illustrates symbolically a stored value card activation system according to one embodiment of the invention.

The present invention is applicable to smart cards. Also termed chip cards, integrated circuit cards, memory cards or processor cards, a smart card is typically a credit card-sized plastic, card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application (a "stored value card"), a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form. The below description provides an example of the possible elements of a smart card, although the present invention is applicable to a wide range of types of smart cards, and especially to stored value cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, but that must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography*, Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification*, Visa International Service Association, 1996; *EMV Integrated Circuit Card Specification for Payment Systems, EMV Integrated Circuit Card Terminal Specification for Payment Systems, EMV Integrated Circuit Card Application Specification for Payment Systems*, Visa International, Mastercard, Europay, 1996; and *International Standard; Identification Cards—Integrated Circuit(s) Cards with Contacts, Parts* 1–6, International Standards Organization 1987–1995.

SYSTEM OVERVIEW

FIG. 1 illustrates symbolically a stored value card activation system 10 according to one embodiment of the invention. Included within system 10 are an issuer 20, a card supplier 22 and a card dispensing machine 24. A stored value card 30 is eventually activated using an activation key 40 and dispensed to customer 26 by machine 24.

Issuer 20 receives cards from card supplier 22 and then issues these cards to customers. Issuer 20 may be any suitable issuing entity such as a bank, financial institution, a service association, a merchant or other organization, or even an agent acting for an issuer.

Stored value card supplier 22 may be any suitable supplier of stored value cards. A card supplier may be any of a variety of card manufacturers such as Gemplus, Schlumberger, Bull, G&D, etc. The supplier often performs card initialization and perhaps personalization, depending upon the card.

Card dispensing machine 24 may be any suitable device arranged to hold stored value cards and to dispense the cards to customers. An embodiment of the invention is used to activate the cards while in the machine. By way of example, card dispensing machine (CDM) 24 is any suitable dispensing machine known in the art such as those made by Gr&D and Schlumberger. Such dispensing machines automatically vend stored value cards of various denominations to customers who deposit money into the machine. Stored value cards may be purchased at a card dispensing machine using cash, a credit card, a debit card or other suitable means of payment. Dispensing machines are also able to go on-line using any suitable communications networkl to verify funds, perform a credit transaction, debit an account, etc.

The functions of machine 24 may also be handled by a human teller using a card terminal. In this scenario, customer 26 purchases a stored value card from the teller rather than from the automatic machine. In exchange for payment from the customer, the teller inserts the purchased stored value card into the card terminal, the card is activated using an embodiment of the invention described herein, and the card is then handed from the teller to the customer. CDM 24 may also take the form of an enhanced POS terminal or a batch personalization machine. A card dispensing machine may also be associated with another device such as an ATM. Card dispensing machine 24 may also include other functionality in addition to the ability to activate and dispense stored value cards, such as the ability to reload reloadable cards and to sell merchandise.

It is also contemplated that the functionality of card dispensing machine 24 may be broken into various pieces. A simple dispensing machine or other means may be used to dispense unactivated cards to a customer who would then take the card to another card terminal to have a card activated. For example, a customer may receive an unactivated stored value card by purchase from a machine, by distribution from a bank or merchant, or through the mail. The customer may then insert the unactivated card into a card reader attached to a personal computer which then performs activation of the card using an embodiment of the invention over the Internet or other communications network. The customer may have prepaid for the card, or the card may be activated over the Internet only upon suitable payment by the customer. A customer may also take an unactivated card received from elsewhere to card dispensing machine which is then able to activate the card.

When first produced by card supplier 22, stored value card 30 is not activated, even though it may be loaded with value. (Of course, supplier 22 may also produce cards that are activated.). In conjunction with issuer activation key 40, supplier 22 produces a security code which is stored on card 30. Issuer activation key 40 is also relayed to dispensing machine 24. Card 30 may then be transported to issuer 20, stored and eventually held within machine 24 without substantial risk of theft because the card is not activated and cannot be used to make a purchase. When customer 26 interacts with machine 24 to purchase card 30, issuer activation key 40 is used within machine 24 to reproduce the security code and to activate card 30 so that the value loaded upon it is available for use. Card 30 is then dispensed to customer 26 in exchange for payment.

Stored value card 30 is any suitable smart card capable of storing value. Preferably, card 30 is a memory card, although the card may also be a processor card having other functionality in addition to memory for storing value. In one specific embodiment of the invention, card 30 is a disposable stored value card. Other details for a specific embodiment of the invention are provided in "Visa International CAD/ Service Payment Terminal Specification" available from Visa International, Foster City, Calif.

The below embodiments describe particular security implementations using certain cryptographic algorithms. In general, any suitable cryptographic technique that meets security needs may be used for the generation of keys and encryption of secret information. The below specifics are provided as one example.

CARD MEMORY EXAMPLE

Figure 2:
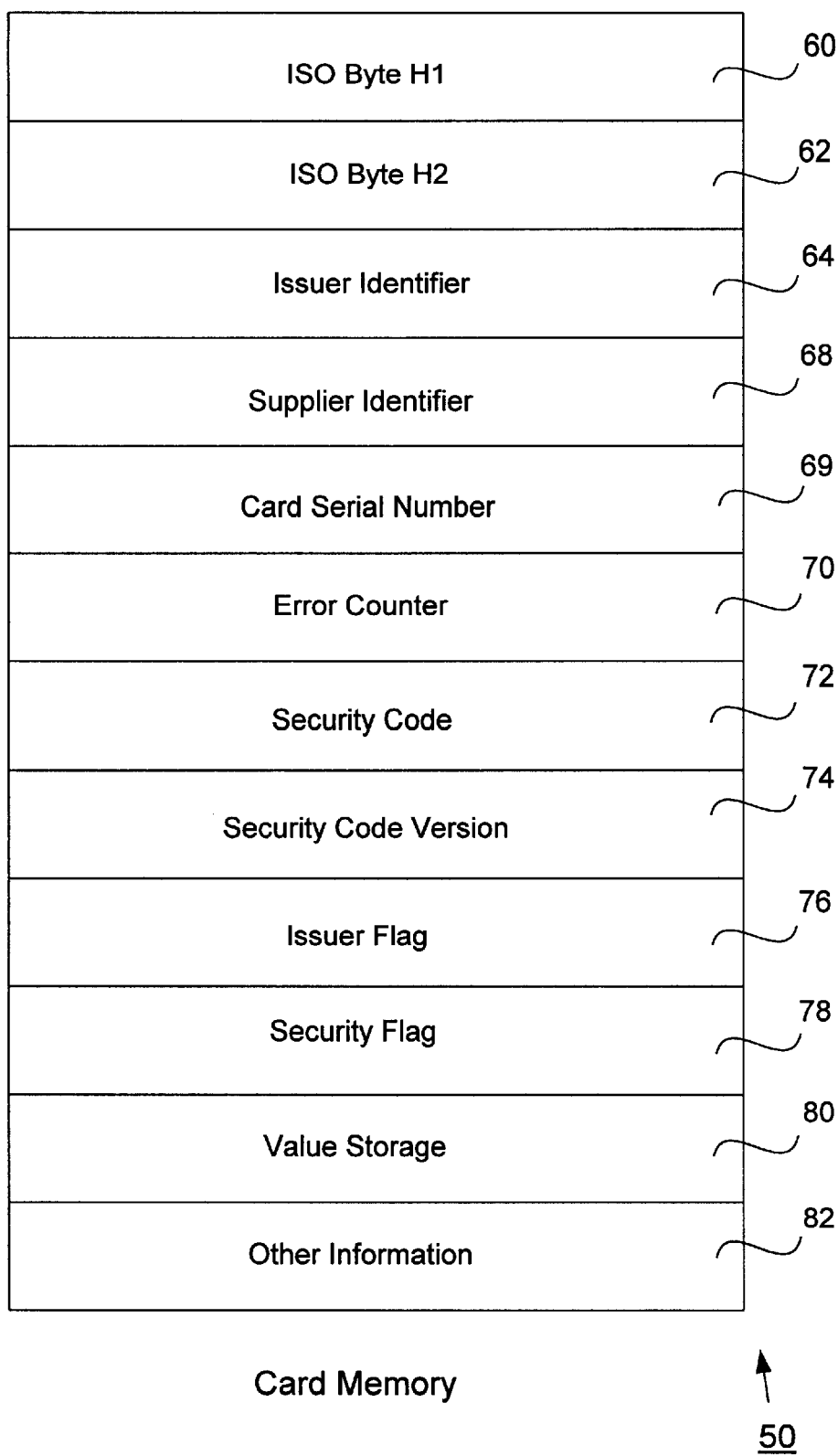
FIG. 2 illustrates an example of contents of a memory of a stored value card useful for implementing an embodiment of the present invention.

FIG. 2 illustrates an example of a memory 50 for stored value card 30 useful for implementing an embodiment of the present invention. Memory 50 is representative of the possible contents of memory 50; the contents shown may be represented in other orders and forms while still encompassing the present invention. Other hardware implementations and implementations using software are also possible for memory storage. In this example, various flags, codes, versions, etc., are used to control the mode of the card for safe transport. Other secure techniques and use of keys may also be used to protect the value on a card while it is being transported and stored.

For memory cards, ISO byte H1 60 and ISO byte H2 62 are two standard bytes of information used to identify the type of card. For example, bytes 60 and 62 may be used to identify card 30 as having a particular chip. For processor and other cards, these ISO bytes are not required. An issuer identifier 64 identifies the issuer of the card. Supplier identifier 68 uniquely identifies the card supplier. Card serial number 69 is an identifying number for the card itself. Error counter 70 is a counter that counts how many times the card is presented with a security code for comparison. In one embodiment, only a certain number of tries are allowed at presenting the correct security code to the card. After these attempts are exhausted, the card will no longer accept a security code for comparison. This feature prevents an unscrupulous individual from repeatedly attempting to crack the security code of the card using automatic means such as a computer program.

Security code 72 is any suitable code stored on the card that prevents the card from being activated except by an authorized entity. If an authorized entity presents the correct security code to the card that matches with security code 72 of memory 50, then the card may become activated. Security code 72 may have any suitable value and format. By way of example, code 72 may be a predefined constant value which is the same for all cards, or may be a value derived from card specific data that produces a unique value per card. Security code version 74 is a value assigned to issuer activation key 40 by issuer 20. This data element is provided to card supplier 22 by issuer 20 along with issuer activation key 40 to be used in the generation of security codes for cards. Security code version 74 indicates a particular version for activation key 40 and is useful when more than one version of an activation key is in use within the system. For example, issuer 20 may start using a new activation key, but cards based upon the older activation key may still be within the system waiting to be dispensed. In this scenario, security code version 74 is useful for distinguishing from amongst the various activation keys which is the appropriate key for use with card 30.

Issuer flag 76 indicates whether or not data within memory 50 may be modified. Initially set to 0 (indicating "issuer mode"), card supplier 22 is free to write data to memory 50. Issuer mode may be used to safely transport a card from a chip manufacturer to a card manufacturer (if needed). Once issuer flag 76 is set to 1, various regions within memory 50 may no longer be modified. For example, security code 72 and version 74 may not be modified once issuer flag 76 has been set to 1. Security flag 78 indicates a mode of the card. In this example, when security flag 78 is set to 0, the card is in standard user mode and may be used for purchases. When security flag 78 is set to 1, the card is in security user mode and its value may not be used. Region 80 is used for the storage of value on card 30. Other regions 82 may be used for other purposes such as additional personalization data, other codes, an authentication key, a response counter, and other data and flags.

In one specific embodiment of the invention, a card may include the following modes. In issuer mode access to memory is secured by a 4-byte transport code. As discussed above, a 4-byte security code protects memory while in security user mode, and a 2-byte access code (user code) protects memory while in standard user mode. Access to particular regions of memory is allowed only after the chip has verified the code presented. For example, while in issuer mode the security code is used as a secret transport code and access is only allowed to the error counter and selected data areas. While in security user mode the issuer flag has been set and further programming of the card identification areas is not allowed. In normal use when the card is in standard user mode (issuer and security flags set), the user code must be presented before value may be decremented from the card. Preferably, various regions of memory are either ROM, PROM or EEPROM depending upon the mode. For example, personalization data is PROM while in issuer mode, but is ROM in other modes. Preferably, the issuer and security flags are PROM in all modes.

When the present invention is used with prepaid payment applications a memory card performs well. In one embodiment, the memory card includes a control unit (providing an interface to the card contacts), various flags, a memory access control unit (including an error counter, security code and user code), an authentication unit (including an authentication key and response counter), a memory unit (with EEPROM, user memory and an erase counter), and a programming unit. The authentication unit is a high security cryptology unit allowing authentication with challenge and response and an individual key.

CARD PRODUCTION FLOWCHART

Figure 3:
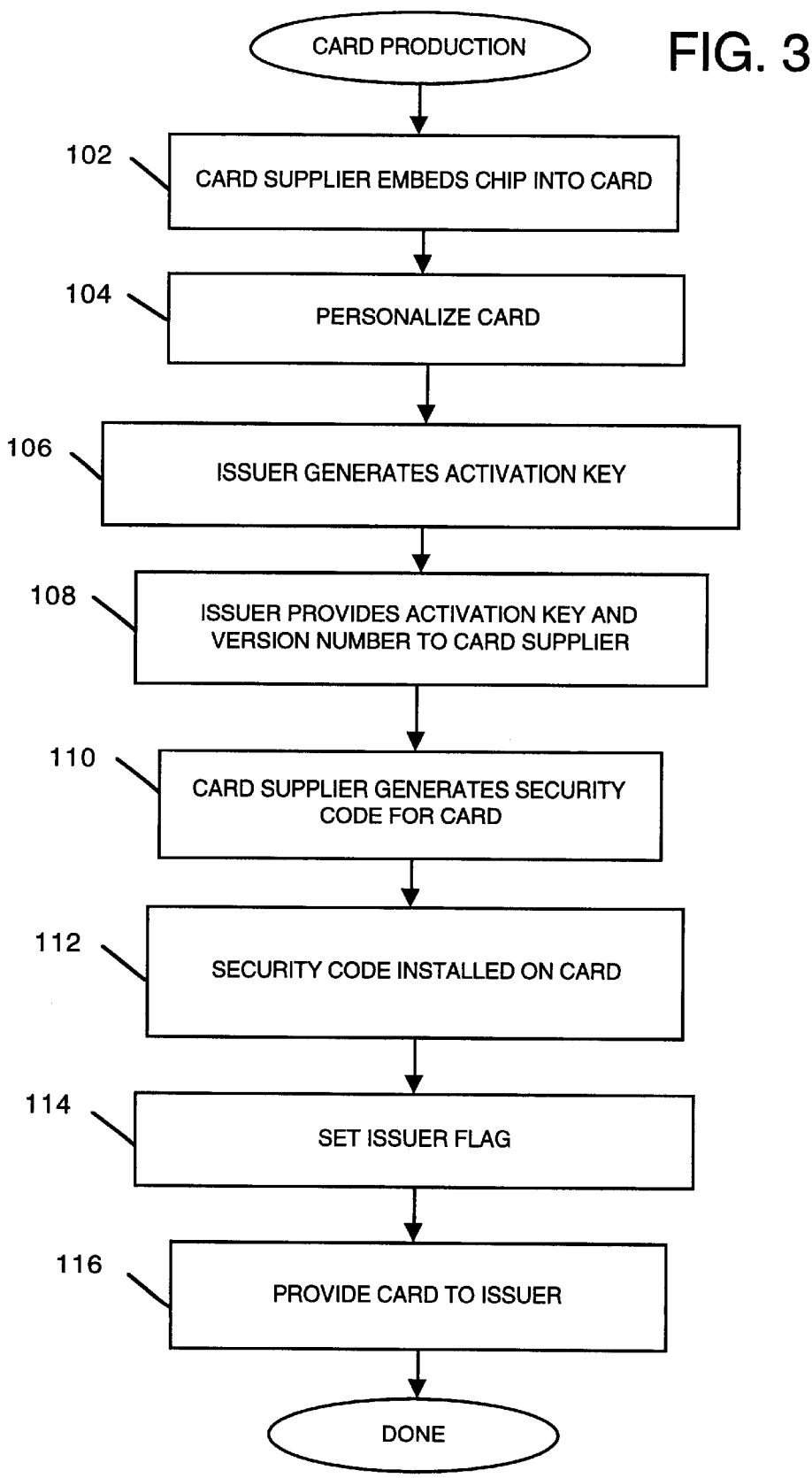
FIG. 3 is a flowchart describing how a card is produced according to one embodiment of the invention.

FIG. 3 is a flowchart describing how a card is produced according to one embodiment of the invention. The production of multiple cards would use the same procedure. In step 102 the card manufacturer embeds a chip into a smart card. Those of skill in the art will appreciate that this step can be performed by any suitable card manufacturer using any of a variety of chips and in many different ways. By way of example, the chip embedded into the smart card is any suitable integrated circuit and is preferably a memory chip. Examples of chips that may be used are those manufactured by Siemens. Most preferably, the embedded chip includes at least card memory map 50 of FIG. 2.

Step 104 initializes and personalizes the card. Unlike a credit card which is personalized for a particular individual, a stored value card is typically personalized by the addition of graphics to the card. Also, various data regions within memory 50 of the card are initialized. For example, regions 60 and 62 are initialized to identify the type of chip on the card, region 64 is initialized with the issuer identifier, a supplier identifier is written to region 68, and error counter 70 is initialized to 0. Preferably, at this point, security flag 78 is set to a 1 indicating that the card is in security user mode and may not be used until activated. This feature prevents a card thief from using a card that has been stolen. In addition, the card supplier stores into region 80 the particular value to be associated with the stored value card.

At this point, a security code 72 may be installed on the card to allow only an authorized party to activate the card. Generation of a security code, its particular value and its installation on the card may be performed in a wide variety of manners. By way of example, the following steps provide one technique for the generation and installation of a security code.

In step 106, the issuer generates an issuer activation key 40. Although the key may be generated by any party, generation of the key by the issuer allows the issuer to keep control over which parties have access to the key and which cards may be activated using the key. Key 40 may be any suitable encryption key useful for generating a security code. By way of example, key 40 is a double-length data encryption standard (DES) key. Also generated at this time by the issuer is a version number of the key. Although any number of activation keys may be generated by an issuer, preferably one activation key is generated per card supplier. In another embodiment of the invention, an activation key is generated for each batch of cards that will be produced by a card supplier. In step 108, the issuer provides the activation key and its version number to the card supplier.

In step 110, the card supplier generates a security code for the card using the activation key and version number received from the issuer. A security code may be generated from an activation key in a wide variety of manners. Any data may be combined with the key using any suitable encryption algorithm under any suitable encryption standard to produce a security code. Furthermore, the security code may be the same for all cards from an issuer, may be the same for all cards received from a particular supplier, may differ only amongst batches of cards from a particular supplier, or may even be a unique value for each card produced by a card supplier. By way of example, one specific embodiment of the present invention uses the following formula for generation of a unique security code for each stored value card produced. The first data elements 60–69 of memory 50 of a stored value card are encrypted under a triple-DES algorithm in Electronic Code Book (ECB) mode using the issuer activation key. The four most significant bytes from the result of this encryption are kept and used as the security code for the card. In this fashion, a security code unique to this card is produced. Of course, the security code may be generated from other information on the card and/or may use other keys.

In step 112, this newly generated security code is installed on the card in data region 72 of memory 50. In addition, the activation key version number received from the issuer is also stored as security code version 74 in memory 50. A hardware implementation of the stored value card prevents changing the card from security user mode to standard user mode unless the security code is presented to the card. In this fashion, the card cannot be used until an authorized entity is able to generate and provide the security code to the card. This security measure may also be performed in software for cards having that capability.

In step 114, issuer flag 76 is set to a value 1 to indicate that sensitive data within memory 50 of the card may no longer be modified. Through hardware implementation, setting this flag prevents the later modification of sensitive data on the card such as security code 72, version 74, etc. A software implementation may also be used to monitor flag 76. Data that needs to be changed for the use of the card such as value 80 may still be modified. At this point, the stored value card has been loaded with value that is the equivalent of cash, but the card has not yet been activated so it may be safely transported to the issuer and stored. In step 116, cards produced by the card supplier are delivered to the issuer for distribution to customers.

A stored value card may be implemented using a variety of techniques to protect or otherwise prevent access to the value on the card. Card authentication of the terminal may be required before value may be decremented. In some situations, authentication is not required. Under normal usage when authentication is required, a card access code (or user code) is supplied to the stored value card in order to decrement value on the card (i.e., use the card). In one embodiment of the invention, hardwired logic of the integrated circuit on the card is used to perform this function. Hardwired logic on the card accepts the card access code, verifies it is correct and then allows access to the value on the card. Such hardwired logic that processes a card access code is well known in the art. Software within a card may also be used to verify a user code. For processor cards, it is also possible that this step of authentication be performed using cryptographic signatures instead of a user code.

In an embodiment of the present invention, value may not be decremented if the card is in security user mode (i.e., if security flag 78 is set). The card must be placed in standard user mode (i.e., reset security flag 78) before value can be decremented. In other words, security flag 76 must be reset to place the card into standard user mode before the card access code can be allowed to decrement value on the card. Although in this embodiment, the above functionality is implemented in hardware on the integrated circuit, this functionality could also be implemented in software. For example, software contained within the memory of a memory card or within a processor card may also perform the functions of determining whether a card is in security user mode, and then receiving and comparing a card access code.

Those of skill in the art will be able to implement this functionality using any of a variety of types of software upon many types of integrated circuits. This functionality could also be implemented outside the card within a card terminal or computer in communication with the card. In this scenario, software outside the card would perform the functions of comparing, setting, resetting, allowing access, etc., and would determine when it is appropriate to allow the value on the card to be accessed.

ASAM CREATION AND MAINTENANCE

Figure 4:
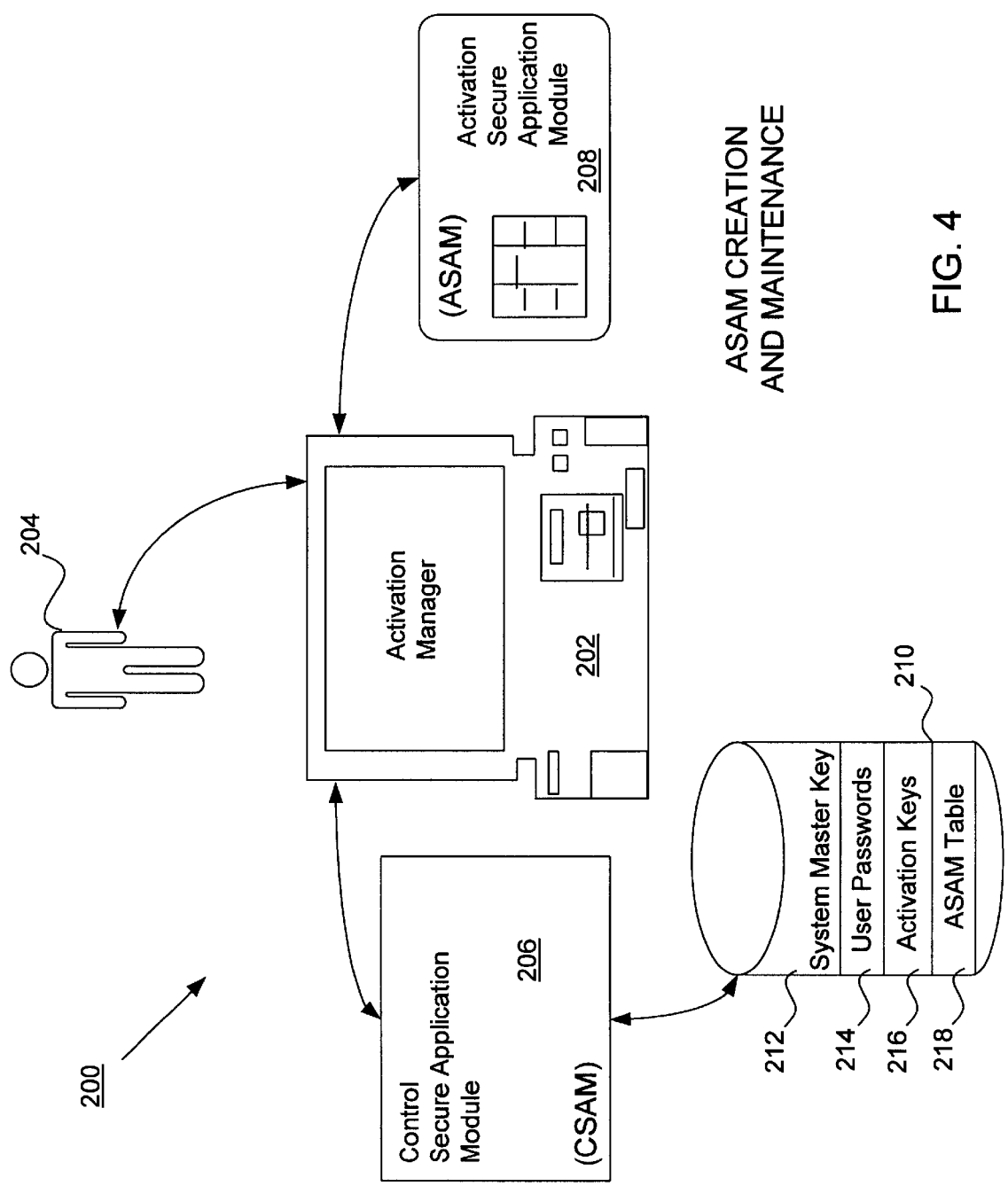
FIG. 4 illustrates an arrangement for the creation of an activation secure application module (ASAM).

FIG. 4 illustrates an arrangement 200 for the creation of an activation secure application module (ASAM). An ASAM will be used by a card dispensing machine to activate cards in a secure manner. ASAM creation uses a process described in FIG. 5 that initializes and personalizes the ASAM. Arrangement 200 illustrates an activation manager 202 under control of a user 204 which is in communication with both control secure application module (CSAM) 206 and an activation secure application module (ASAM) 208.

Activation manager 202 may be any suitable controlling device arranged to securely initialize and personalize ASAM 208. By way of example, application manager 202 is implemented as a software application running on a personal computer or other host divice. Alternatively, activation manager 202 may be implemented on a laptop computer for portability, or may even be implemented inside a card dispensing machine or other activation device that would allow user 204 to create and/or perform creation and maintenance of an ASAM from a remote site using a communications link.

CSAM 206 is a secure module used by activation manager 202 for the creation of ASAM 208. CSAM 206 may be implemented in a variety of manners including as a smart card based secure application module (SAM) or as a hardware security module (HSM). A hardware security module (HSM) is used to facilitate cryptographic processing and typically stores secret keys and encryption algorithms, performs cryptographic functions on secret data and generates session keys and signatures. As is known in the art, an HSM is generally a tamper proof device, which uses some level of physical security measures to protect the sensitive information inside. An HSM may be any security module used in the industry, such as a RACAL HSM Model RG7000, or the security box attached to automatic teller machines. In alternative embodiments, HSM 130 may be implemented on a smart card within a card reader, on a series of smart cards, may be implemented on any suitably secure computer, or may be implemented in software.

A variety of data is managed by activation manager 202 for the creation of ASAM 208. Included is a system master key 212 used to derive a zone key for each ASAM, user passwords 214 that allow initiation of ASAM maintenance, a table of all current issuer activation keys 216, along with their identifying indices, and a table of all active ASAMs 218. Each entry in the table provides the ASAM identifier and the desired maximum value for the ACC. Preferably, these keys and passwords are stored securely. In one embodiment, sensitive keys and passwords are stored within CSAM 206, while in another embodiment, this information is stored within database 210 accessible by CSAM 206 and is in encrypted under a local master key (LMK) of CSAM 206. Database 210 may also be located within activation manager 202, at a remote site or in any other suitable location.

Preferably, system master key 212 has an associated version number and is changed periodically. More preferably, activation manager 202 is able to maintain at least two system master keys. System master key 212 is used to derive a zone key for secure communication with an ASAM. Based upon the version number, an ASAM maintenance process (as described below in FIG. 6) is able to determine whether the zone key in the ASAM should be replaced. Activation manager 202 also has the ability to generate new activation keys when required and to delete keys. In one embodiment, activation keys are double-length DES keys that are stored securely. Furthermore, activation manager 202 preferably exports activation keys to a card supplier in a secure manner.

ASAM 208 is preferably implemented on a smart card for affordability, but may also be implemented as ea HSM. It has the functionality as described below.

Figure 5:
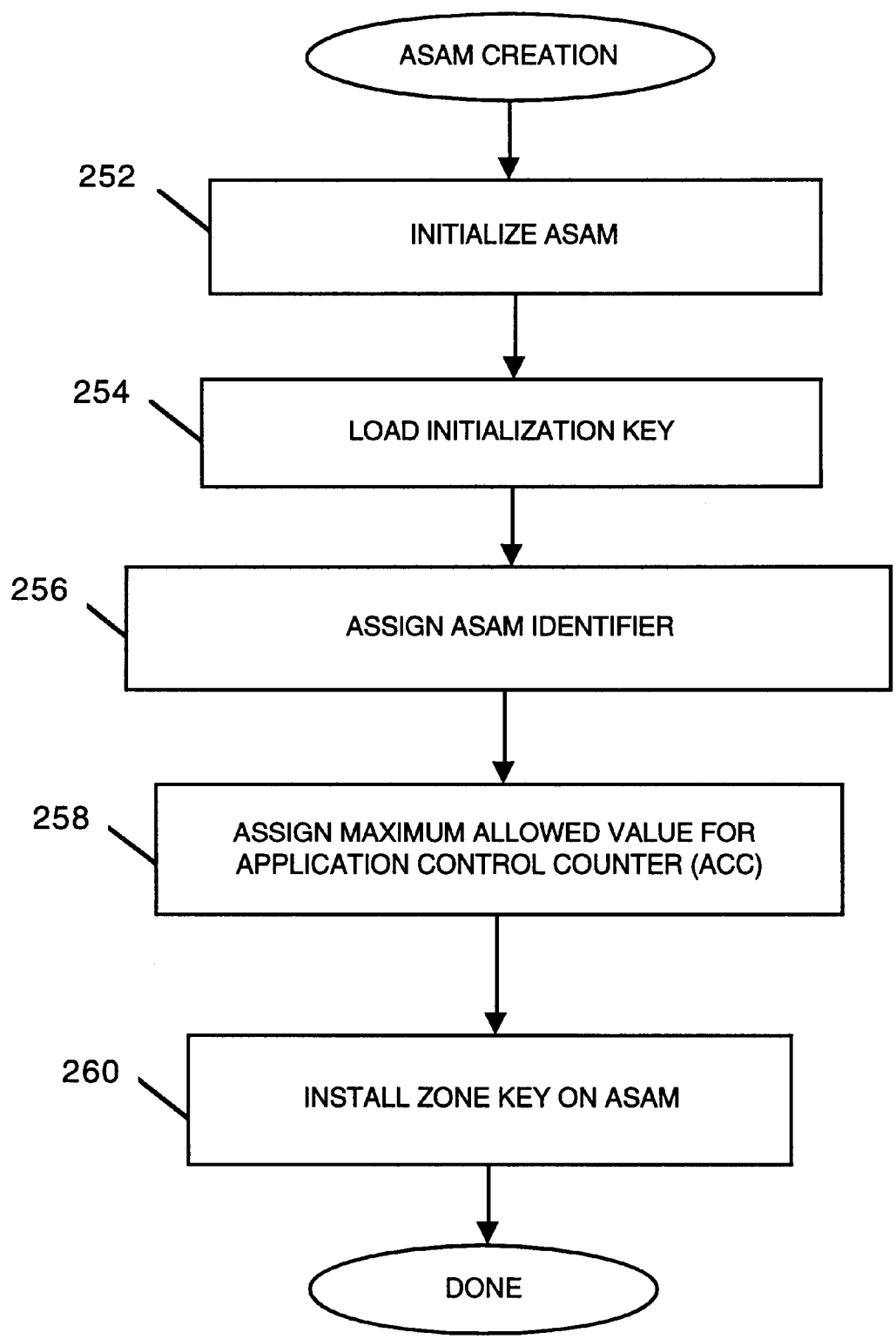
FIG. 5 is a flowchart describing one technique for the creation of an ASAM.

FIG. 5 is a flowchart describing one technique for the creation of ASAM 208. Creation of an ASAM refers to the initialization and personalization of the ASAM. Once an ASAM has been created, it is ready to be used within a card dispensing machine to activate cards within the machine when sold.

In step 252, ASAM 208 is initialized with any parts of the software application needed for its operation within a card dispensing machine; preferably the software is loaded into an EEPROM within the ASAM. Additionally, any data and/or file structures needed by the ASAM are also loaded at this time.

In step 254, the ASAM is loaded with an initialization key. This initialization key will be used to encrypt the zone key to be loaded into the ASAM subsequently. The initialization key may be loaded using any suitable technique and use any encryption standard. In a currently-preferred embodiment, DES is used. Although the initialization key may be different for each ASAM for an issuer, preferably all ASAMs for an issuer use the same initialization key. In one specific embodiment, the initialization key is loaded by providing multiple portions of data to the ASAM. Once inside the ASAM, an XOR is performed on these multiple portions of data with the result forming the initialization key. The key is then stored within the ASAM within a secure location. Using an initialization key to encrypt the zone key allows the zone key to be transmitted and loaded in a secure fashion.

At this point, initialization is complete and personalization of the ASAM may begin. In a preferred embodiment, before personalization can begin user 204 is required to provide a password to activation manager 202. Once personalized, ASAM 208 may be loaded with activation data using, for example, the process described in FIG. 7.

In step 256, ASAM 208 is assigned a unique identifier. Preferably, activation manager 202 determines a unique ASAM identifier which is assigned and loaded into ASAM 208. In step 258, ASAM 208 is assigned a maximum allowed value for its application control counter (ACC). The ACC limits the amounts of times that ASAM 208 may attempt to activate the stored value card. Use of the ACC thwarts unscrupulous individuals who are either trying to break the security code on a card using an ASAM, or who have illegally acquired a card dispensing machine and are attempting to activate a large number of cards using a single ASAM. This maximum allowed value for the ACC is loaded into ASAM 208.

In step 260, a zone key is installed on ASAM 208. As mentioned previously, a zone key is a cryptographic key used to secure communications between two nodes. In this embodiment, the zone key to be installed on ASAM 208 permits future secure communications between ASAM 208 and CSAM 206. The zone key may be installed and derived using a wide variety of techniques. In a preferred embodiment of the invention, the following steps are used. Activation manager 202 first requests the zone key from CSAM 206; this request includes the user password and the ASAM identifier. Upon validation of the user password by CSAM 206, CSAM 206 generates the zone key fbr ASAM 208. The zone key is then encrypted under the initialization key and provided to activation manager 202 in response to its request. Activation manager 202 then sends a "LOAD ZONE KEY" command to ASAM 208 along with the encrypted zone key. ASAM 208 then decrypts the zone key and replaces the initialization key with the zone key.

It will be appreciated that the zone key may be derived in any manner. By way of example, the zone key is a double-length DES key shared between ASAM 208 and CSAM 206 that is unique to ASAM 208. The zone key may be derived using the following algorithm. A first key is produced by encrypting the ASAM identifier (padded with zeroes) using the system master key under a triple DES algorithm. A second key is produced by encrypting the ones complement of the ASAM identifier (padded with zeroes) using the system master key under a triple DES algorithm. The zone key is then constructed using a concatenation of the first key and the second key. Once ASAM 208 has been initialized and personalized (ASAM creation), maintenance of ASAM :208 may be performed.

Figure 6:
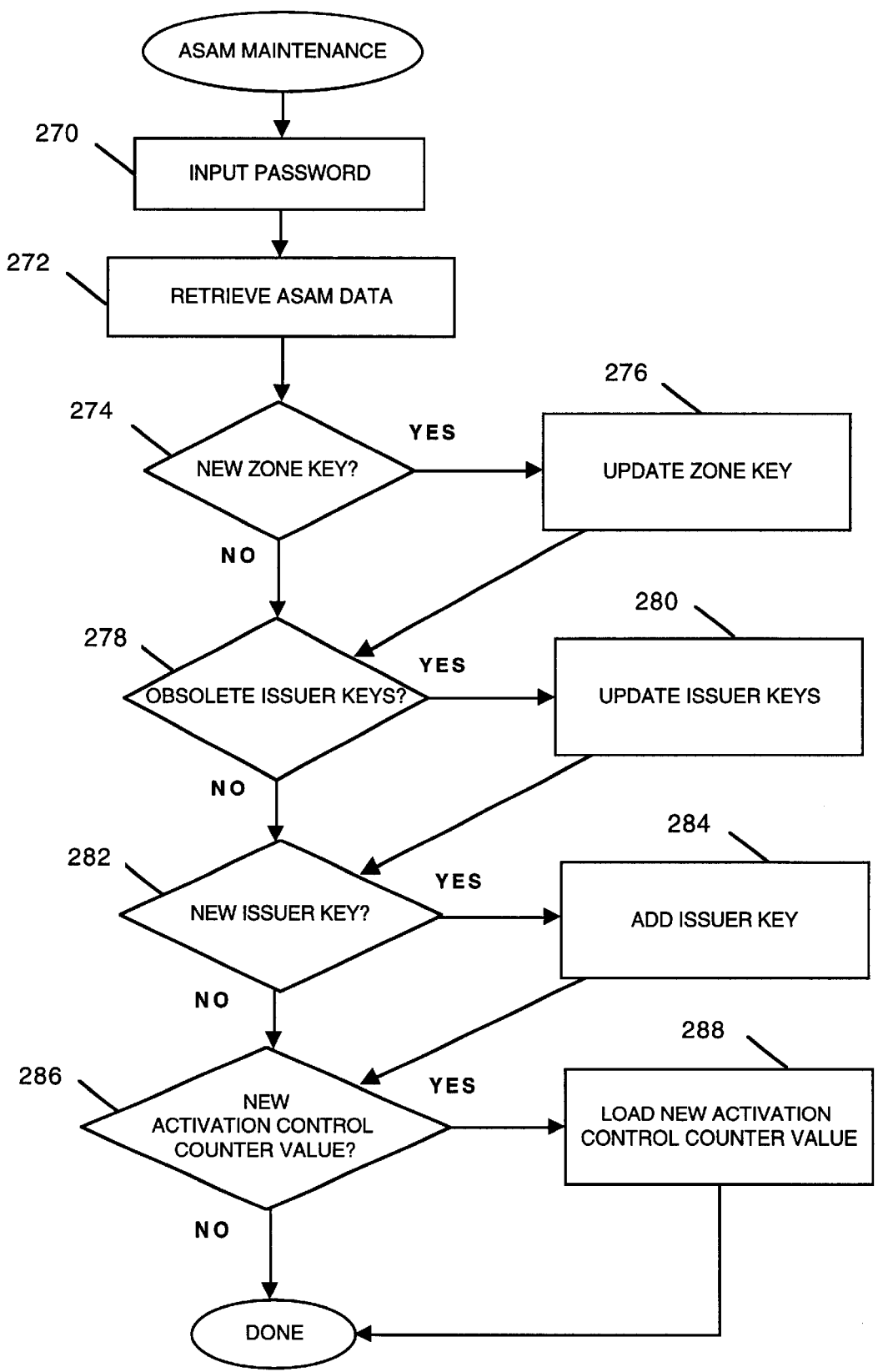
FIG. 6 is a flowchart describing one technique for performing maintenance of an ASAM.

FIG. 6 is a flowchart describing one technique for performing maintenance of ASAM 208. In one embodiment of the invention, maintenance of ASAM 208 is performed under the control of activation manager 202 while in communication with CSAM 206. Maintenance may occur using a dial-up connection between the card dispensing machine that incorporates ASAM 208 and the computer hosting activation manager 202, or by physically bringing ASAM 208 to activation manager 202 and placing it in a card reader locally attached to the activation manager. Alternatively, it is possible to bring a portable computer hosting activation manager 202 along with CSAM 206 to the site of a card dispensing machine to perform maintenance of ASAM 208.

ASAM 208 contains data that is preferably updated from time to time including: a zone key used for secure communication with activation manager 202, a set of issuer activation keys, and an activation control counter (ACC). Of course, before ASAM 208 is used for the first time, a procedure similar to that described in FIG. 6 is used to install a zone key, install a set of issuer activation keys, and to set the activation control counter to a particular value. For example, when ASAM 208 is readied to be placed in the field, the procedures of FIGS. 5 and 6 may be performed to prepare ASAM 208 for the activation of stored value cards in a card dispensing machine. Once ASAM 208 is being used in the field and maintenance is desired, the procedure of FIG. 6 may be used to perform this maintenance.

In step 270, user 204 supplies the appropriate password to allow ASAM maintenance to occur. In step 272, data from ASAM 208 is retrieved to allow for proper maintenance. This data includes the ASAM identifier, a list of issuer activation keys, the current value of the activation control counter, its maximum value, and the current zone key version number.

Step 274 determines whether a new zone key is required by inspecting the current zone key version retrieved from ASAM 208. If a new key is required (or if this is first time maintenance) then step 276 updates the zone key. Step 276 may be performed in many ways. In one specific embodiment, an update command to replace the ASAM zone key is used that includes a new zone key version number, a new double-length zone key and a zone key check value. Preferably the entire command data is encrypted. The response from ASAM 208 is the new zone key version number and the zone key check value both in the clear. Preferably, the new zone key is encrypted under the old zone key.

Step 278 determines whether any issuer activation keys are obsolete and may need to be deleted. If so, step 280 updates the issuer keys in ASAM 208. Step 280 may be performed in many ways. In one specific embodiment, an update command to delete various issuer activation keys is provided to ASAM 208. This command includes a variable length list of key indices indicating which keys to delete.

Step 282 determines whether new issuer activation keys should be added to ASAM 208. New keys might need to be added if the issuer has come out with new versions or if ASAM 208 is being maintained for the first time. If so, step 284 adds a new issuer key or keys to ASAM 208. Step 284 may be performed in many ways. In one specific embodiment, an update command to add an issuer activation key is performed for each key to add. This command uses a block for each key being added that includes a new issuer activation key version number, a new double-length issuer activation key and an activation key check value. Preferably the entire command data is encrypted. The response received from ASAM 208 is one block for each key successfully added and includes both the key version number and the key check value in the clear. Preferably the new activation keys and associated information are encrypted under the current zone key.

Step 286 determines whether the activation control counter (ACC) should be updated. For example, before ASAM 208 is released to the field, it will need to have its ACC value set. Also, if a card dispensing machine using ASAM 208 has been activating a great deal of cards, it is possible that its ACC value is approaching the maximum ACC value allowed for ASAM 208. If so, it may be desirable to update the ACC value to a new value. Advantageously, the ACC value can be set to a particular value depending upon the environment in which the card dispensing machine is located. For example, for the interior of a rapid transit station that has good security and may sell an extremely large quantity of low-value cards, it may be desirable to set the ACC value to a fairly high number. Because the cards have lower value and the machine is located in a secure area, the risk is less and the ACC may be set higher. For a card dispensing machine located on the street, however, it may be desirable to set the ACC to a lower value due to the increased risk of theft of the machine.

If the ACC value is to be updated, step 288 loads a new ACC value into ASAM 208. Step 288 may be performed in many ways. In one specific embodiment an update command to load a new ACC value is used. This command includes the new ACC value and the current ACC value. At this point, maintenance of ASAM 208 is complete.

Communication of commands and responses between Activation Manager (AM) 202 and ASAM 2C08 may be performed using many different protocols. In one embodiment of the invention, the update of steps 276, 280, 284 and 288 begins with an initialize update command from AM 202 to ASAM 208. Preferably this command sends the CSAM identifier and in turn return receives the ASAM identifier, the update transaction counter (NTU), and the zone key version number (VKZ).

When processing the initialize update commands, preferably ASAM 208 uses the internal update transaction counter to keep track of how many updates are being requested. This feature provides additional security. The internal counter is incremented for each requested update; once its maximum value is reached, a response code indicating; that fact is returned to AM 202 instead of the normal response to an initialize update command. Preferably the internal update transaction counter is implemented so that it does not roll over when it reaches its maximum value.

Once AM 202 receives a response to its initialize update command, it sends an update command (as described above) along with a message authentication code (MAC) and receives in return response data and a completion code from ASAM 208. Once the update command is received by ASAM 208, it copies its internal update transaction counter to permanent storage and verifies the MAC. It then performs the requested update (of issuer keys, ACC value or zone key) and returns a response to the command as has been described above. If any error occurs during MAC verification or during the update, an appropriate response is returned to AM 202. Once AM 202 has received a response to its update command, it validates this received response data. Any errors occurring during any of the initialize update, update command or validate commands result in an error condition code being set.

Although the data integrity of each update command may be protected in many ways, preferably a message authentication code (MAC) is used. The MAC is generating using the ASAM zone key using a block cipher algorithm often referred to as CBC mode. In a currently-preferred embodiment, generation is performed as described in the reference, "ISO/IEC 9797," second edition, or may be performed as described in the reference, ANSI X9.19, 1996.

Similarly, the data and commands that update keys may be encrypted in a variety of ways. In a currently-preferred embodiment, encryption is performed using DES in ECB mode with a single-length session key as defined in the reference "ANSI X3.92," although other techniques may also be used. The session key is derived from the ASAM zone key using the following algorithm. The CSAM identifier, ASAM identifier and internal transaction update counter are concatenated together and encrypted using the zone key under the triple DES encryption algorithm to obtain the session key. Furthermore, for every key that is updated, a check value is included in the encrypted data. The check value is calculated by using triple DES to encrypt an 8-byte block of binary zeroes. The check value in the clear is returned to the activation manager to validate that the data was received and decrypted correctly. Check values may be calculated in other ways as well.

Once ASAM 208 has been maintained properly for the first time and is present within a card dispensing machine, it is ready to begin activation of stored value cards within the machine.

CARD ACTIVATION

Figure 7:
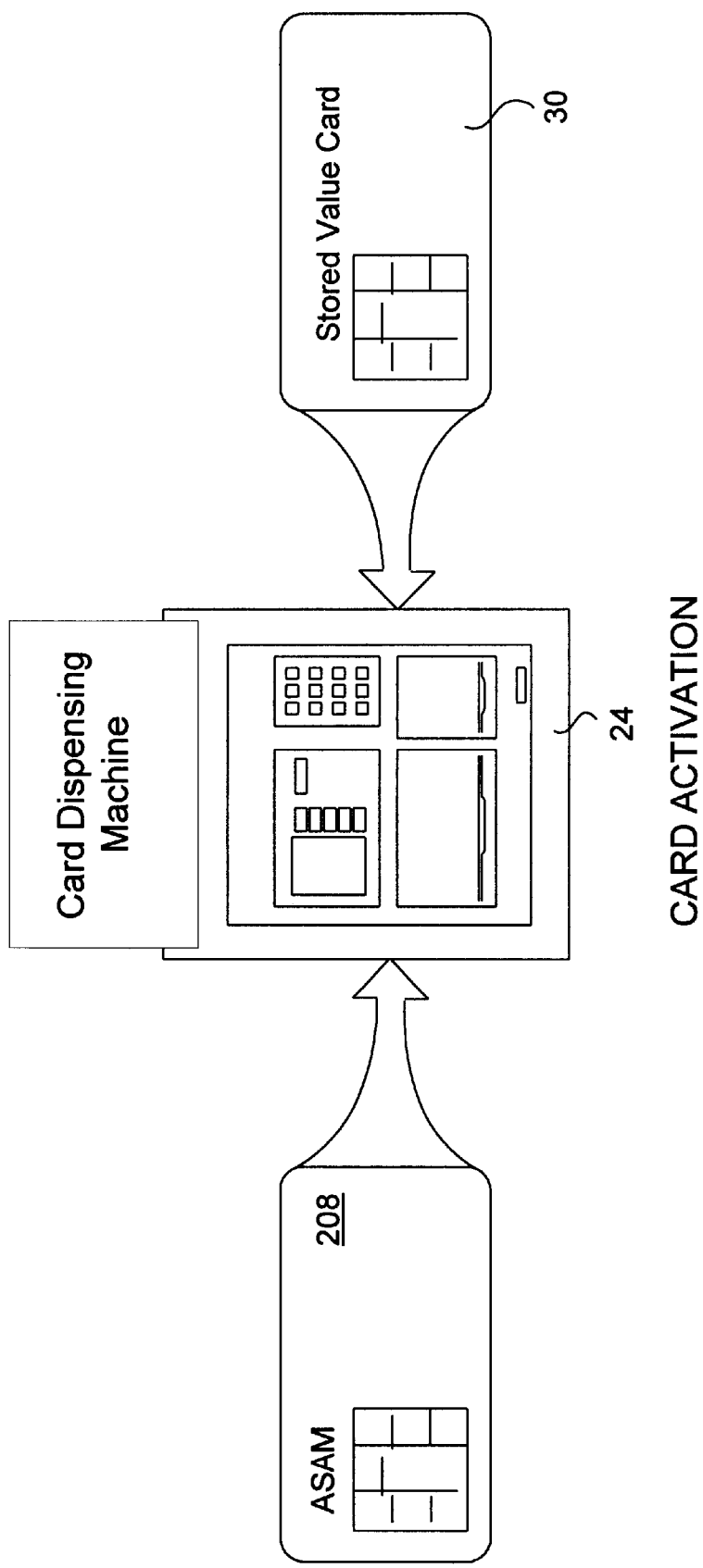
FIG. 7 illustrates in greater detail a card dispensing machine.

FIG. 7 illustrates card dispensing machine 24 in greater detail. Included within machine 24 are an ASAM 208 and any number of stored value cards 30 ready to be activated and dispensed to customers. For ease of explanation, ASAM 208 and card 30 are shown enlarged outside machine 24. Machine 24 controls the card activation process using ASAM 208 to store issuer activation keys and to calculate card security codes necessary to activate stored value cards. In a typical situation, a customer purchasing a card at machine 24 receives a card dispensed from the machine once the card has been activated using ASAM 208.

Figure 8A:
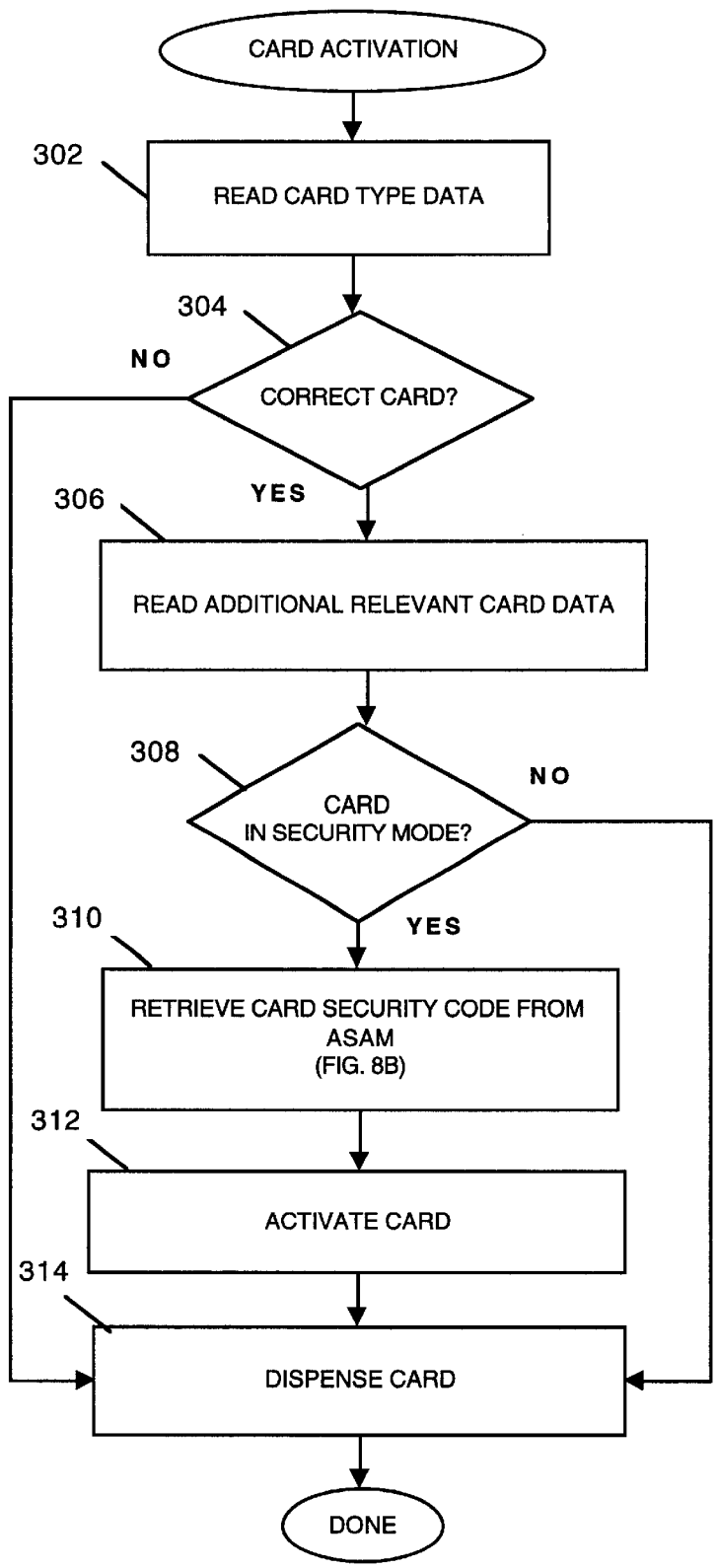
FIGS. 8A and 8B are flowcharts describing a process by which a card is activated within a machine using an ASAM.
Figure 8B:
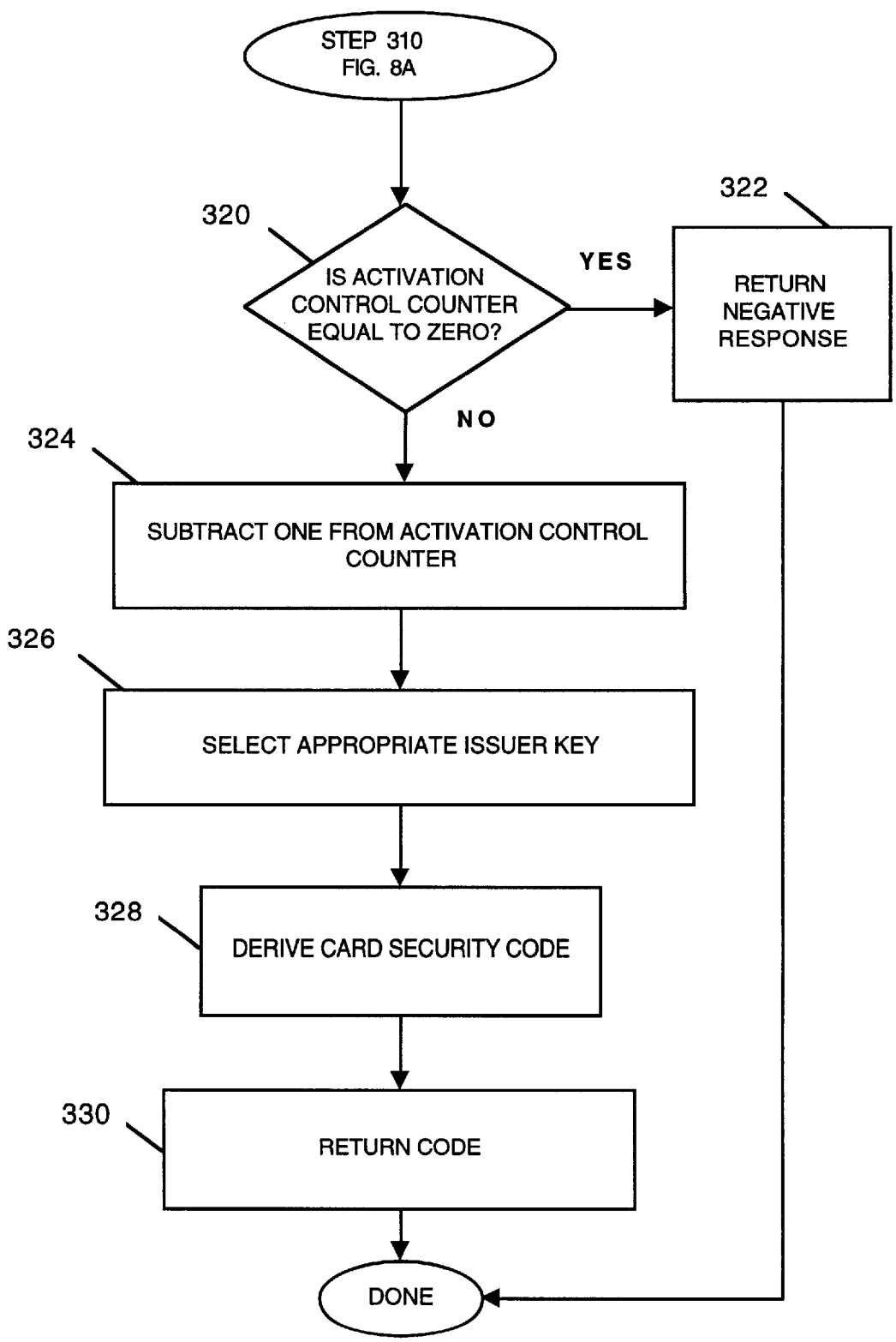

FIGS. 8A and 8B are a flowchart describing a process by which card 30 is activated within machine 24 using ASAM 208. The process of FIGS. 8A and 8B is initiated when a customer makes a purchase of a stored value card from machine 24. In step 302 machine 24 reads card type data from card 30. In this particular embodiment, type information is stored in the memory 50 of card 30, namely byte H1 60 and byte H2 62. These bytes indicate the type of chip used within card 30 and indicate whether or not this card is suitable for activation. For processor and other types of cards, these bytes may not be required; step 302 would then not be required or another technique may be used to determine the type of the chip.

Based upon the card type data, step 304 determines whether this card is suitable to be activated. In this specific embodiment, step 304 determines whether card 30 has embedded within it a particular type of chip. If so, this indicates that the card may be either in a security user mode or a standard user mode. If the card is not the correct type, then in step 314 the card is simply dispensed to the customer, assuming that payment has been made. A card that is not suitable for activation is presumably already activated and may be dispensed straight away.

Step 306 reads additional relevant data from card 30 useful for activating the card. This additional data includes the issuer identifier, the card supplier identifier, the version number of the issuer activation key and the security flag. Step 308 determines whether the card is in security user mode by checking the retrieved security flag. If not in security user mode, then the card is already in standard user mode and need not be activated. The card is then dispensed to the customer in step 314.

If, however, card 30 is in security user mode, then the appropriate security code for card 30 is retrieved from ASAM 208. The security code retrieved from ASAM 208 will be used to activate card 30. The security code may be retrieved from ASAM 208 or other suitable secure device in a wide variety of manners. By way of example, FIG. 8B describes one technique for retrieving the security code. In step 312 the retrieved security code is presented to card 30 to activate the card.

Verification by card 30 that the security code presented to it is the same security code present within the memory of the card may be performed using different techniques. In a preferred embodiment of the invention, as described above, the chip on card 30 is implemented to compare a presented security code with the security code already stored on the card. Implementation of this comparison in hardware can be performed by those skilled in the art of chip implementation. In other embodiments, software resident on card 30 may perform the comparison and the activation of the card, or another secure device (such as ASAM 208 or machine 24) may compare the security codes and activate card 30 upon success.

In a preferred embodiment, the security code is verified and the card activated using the following procedure. First an address reset of the card is performed. Next, the error counter is incremented by one by setting the next free bit in error counter 70. For example, if error counter 70 has 4 bits only 4 tries are allowed to activate card 30. This feature prevents unauthorized attempts to activate a card over and over again using automatic means. Next, the security code retrieved from ASAM 208 is presented to card 30. The security code is presented at the I/O pin of the card bit-by-bit. The card compares the received security code bit-by-bit to that stored in its memory. If successful, the next step is to erase the error counter. Successfully erasing error counter 70 indicates that the presented security code has been verified by card 30. Preferably an erase operation is applied to the error counter bits in memory. If the security code has been correctly entered the error counter is allowed to be erased. A successful erase operation can be used as an indication of a successful security code verification. If the comparison was unsuccessful, the chip does not allow the error counter to be erased; the error counter then indicates how many unsuccessful comparisons have been tried (up to four). Next, security flag 78 on card 30 is set to 0 to indicate regular user mode. Setting the security flag will not be possible unless the presented code has been verified.

At this point, card 30 is now activated and ready for use. Finally, security code 72 on card 30 is erased. This erasure prevents an unscrupulous party from later reading the security code. Once card 30 has been activated, the card is dispensed to the customer in step 314. If activation is unsuccessful, the card is rejected and flagged as unusable within machine 24.

FIG. 8B is a flowchart describing one technique by which step 310 of FIG. 8A may be performed. In step 310, machine 24 requests the security code from ASAM 208. ASAM 208 manages security for the activation process. In addition to providing secure key management, ASAM 208 also provides the activation control counter (ACC) that limits exposure to fraud and theft by limiting the number of cards that ASAM 208 may activate.

Step 320 determines whether the ACC is equal to 0. If so, this indicates that the maximum number of cards has already been activated by ASAM 208 and no more cards may be activated. Accordingly, step 322 returns a negative response indicating that card 30 will not be activated and step 310 is done. If, however, the maximum number has not yet been reached, then step 324 subtracts 1 from the ACC.

Using data previously read from card 30, step 326 selects the appropriate issuer activation key with which to derive the card security code. Preferably, a key index based upon the issuer identifier, the card supplier identifier, and the activation key version number is used to select the appropriate activation key. Such an index is useful as there may be numerous activation keys available with an ASAM 208 for use. For example, each issuer may use a different activation key, and may use different activation keys for different suppliers as well as different keys for different batches from the same supplier. Furthermore, there may be different versions of an activation key. Once the appropriate issuer activation key has been selected, step 328 derives the card security code in the same manner and using the same information as in step 110 of FIG. 3. Because the same activation key is used, along with the same information for the card, an identical security code will be derived. Finally, step 330 returns this derived security code back to machine 24 for presentation to card 30.

Other embodiments are also suitable for activating card 30 using ASAM 208. For example, card 30 may be dispensed from a machine or received by a customer in another fashion while still in security user mode. The customer may later present card 30 to a suitable activation device including ASAM 208 and have the card activated at that point using a similar process as shown in FIGS. 8A and 8B. Furthermore, such activation could take place at a merchant location, kiosk or other public site where an activation device is located, or it could take place using any suitable computing device with a network connection. For example, the functionality of machine 24 could be split over the Internet. In this example, a customer inserts an unactivated card into a card reader attached to a personal computer in the home or office. From this location, card 30 communicates through the personal computer over the Internet to ASAM 208 located in a remote location. Commands and communication may still flow between card 30 and ASAM 208 in a similar fashion as described above, except that the two devices would be remote from one another. Other scenarios in which card 30 may be activated are also possible.

Figure 9:
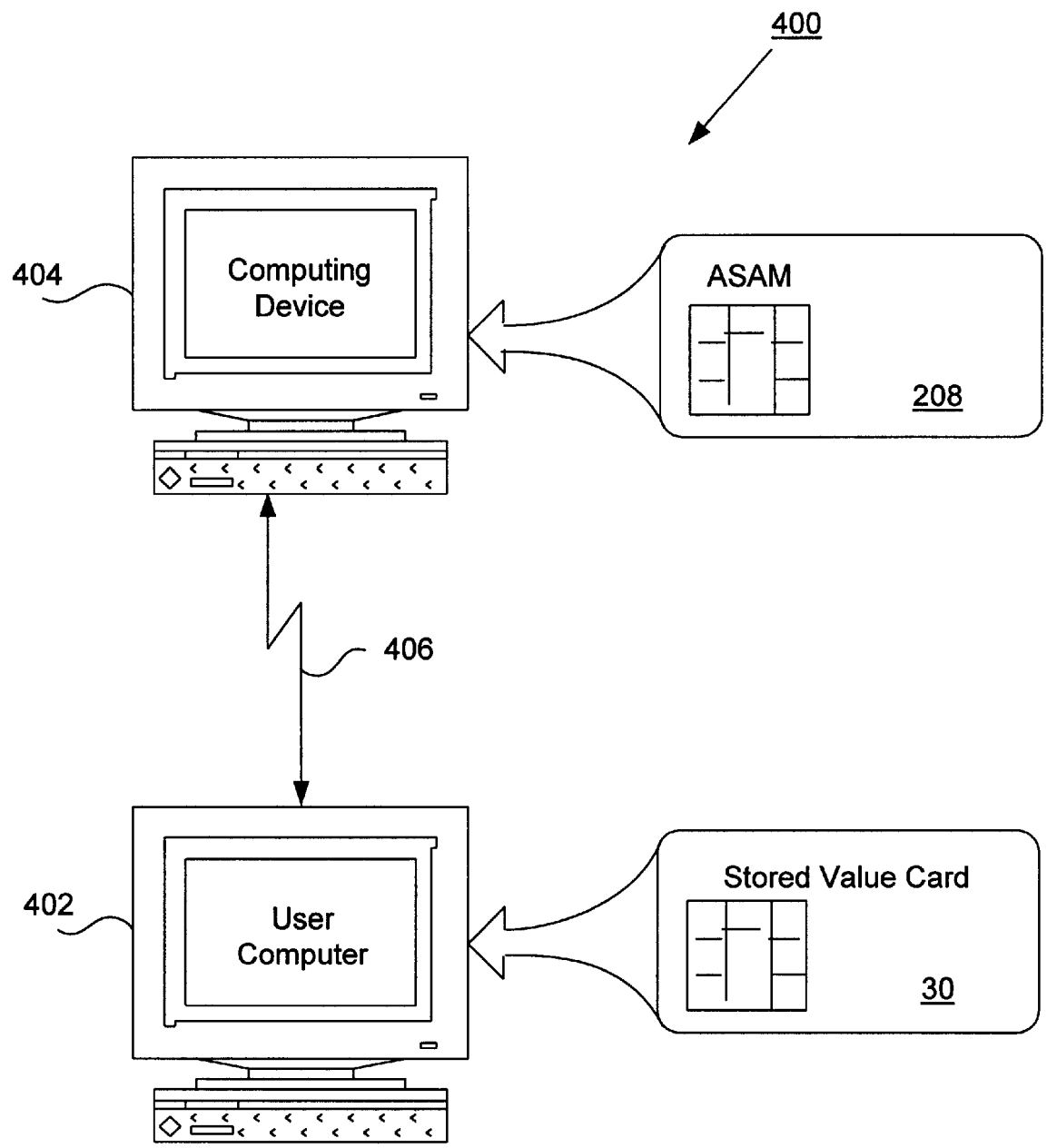
FIG. 9 illustrates a scenario in which a card is activated remotely using an ASAM.

FIG. 9 illustrates a scenario 400 in which card 30 is activated remotely using ASAM 208. Scenario 400 shows user computer 402 in communication with any suitable computing device 404 over any suitable telecommunications link 406 such as the Internet. Associated with user computer 402 is card 30 present in a card reader device attached to computer 402. In a similar fashion, ASAM 208 is either located in a card reader device attached to computing device 404, or is implemented within a card dispensing machine 24 or other device having similar functionality.

FIELD MAINTENANCE OF ASAM

Figure 10:
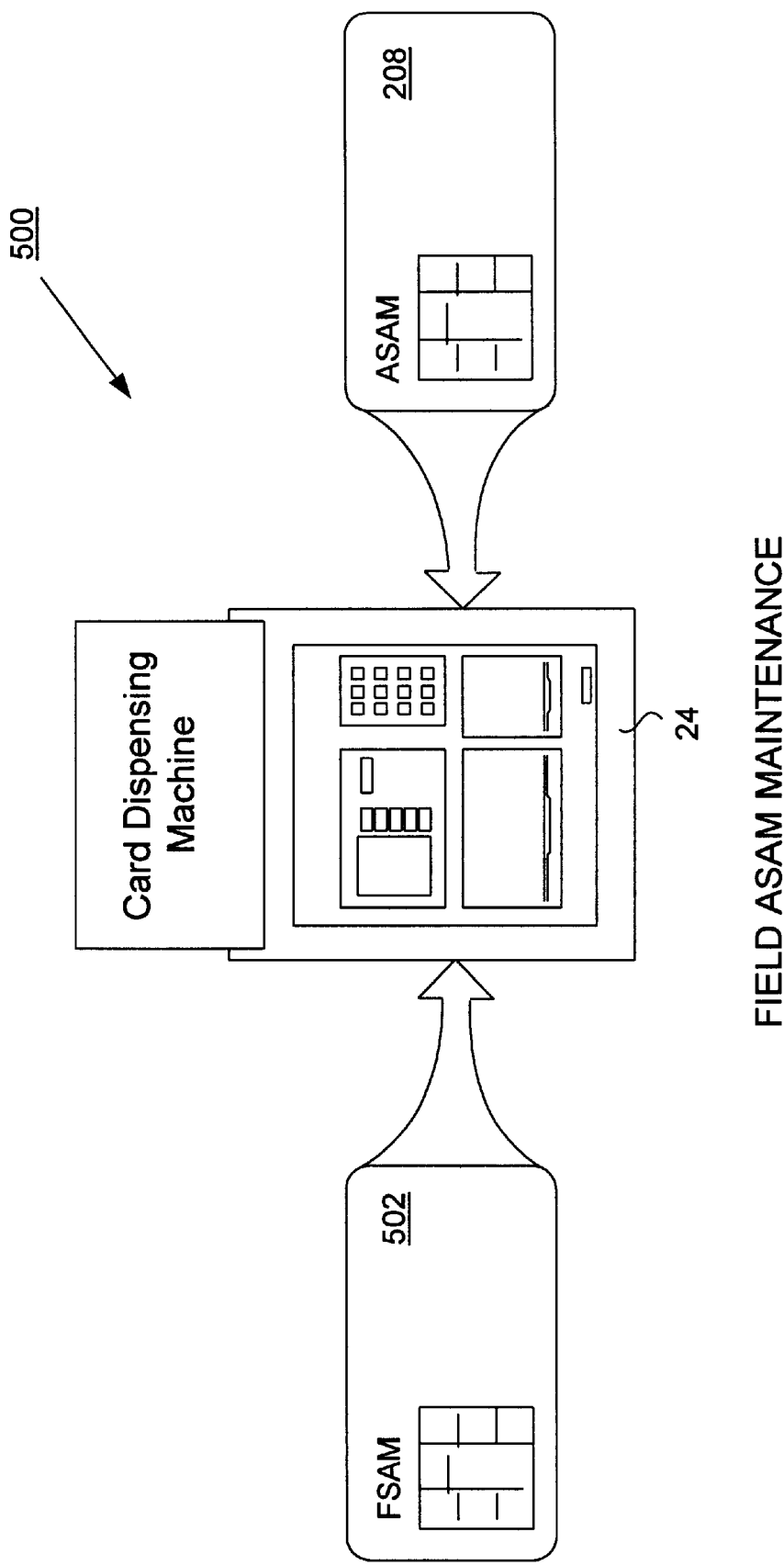
FIG. 10 illustrates a scenario in which field maintenance is performed upon an ASAM.

FIG. 10 illustrates a scenario 500 in which field maintenance is performed upon ASAM 208. In this embodiment, field secure application module (FSAM) 502 is present within card dispensing machine 24 and is able to perform maintenance of ASAM 208 in the field.

The previous embodiment of FIGS. 4 and 6 illustrates maintenance of ASAM 208 performed by activation manager 202 under control of CSAM 206. This embodiment contemplates either that ASAM 208 be physically present in a card reader device attached to AM 202, or that there is a telecommunications link between AM 202 and a card dispensing machine in which ASAM 208 is present. In other scenarios, however, it may be desirable to maintain ASAM 208 in the field without the need for a telecommunications link back to AM 202 or requiring that ASAM 208 be physically transported back to AM 202. For example, many card dispensing machines may not have the functionality to communicate with AM 202 over a secure link to perform ASAM maintenance and/or it may be difficult or expensive to return ASAM 208. Because a card dispensing machine is visited regularly by a service technician for physical maintenance (for removing cash and/or replenishing stored value cards) it would be advantageous to perform maintenance of the ASAM at the same time.

To these ends, FSAM 502 can be carried by a service technician to card dispensing machine 24 when it is serviced and inserted into a card reader device attached to machine 24. The maintenance process of ASAM 208 is then controlled by code within FSAM 502. FSAM 502 may be any suitable device similar to CSAM 206 for performing maintenance of an ASAM. For example, FSAM 502 could be a hardware security module, although preferably it is implemented on a smart card.

From the ASAM's point of view, the maintenance process remains the same. AM 202 will now be responsible for the creation and maintenance of FSAMs, as well as the creation of ASAMs. With the exception of the differences noted below, the creation and maintenance of an FSAM may be performed in a similar manner to that previously described in FIGS. 4–6 above.

In one embodiment, FSAM creation and maintenance includes the following differences from that of ASAM creation and maintenance. When a zone key is first loaded or replaced in an FSAM, the FSAM will maintain both the new zone key and the old zone key to insure it can still communicate with ASAMs using the previous zone key. Additionally, each FSAM will carry a maximum ACC value and a current ACC value similar to those carried by ASAMs. Each time an FSAM loads a new ACC value into an ASAM, it will decrement its own current ACC value by a corresponding amount. When its own ACC current value is 0, it can no longer perform maintenance on ASAMs. This added level of security limits the number of cards that an FSAM can permit an ASAM to activate.

One of the advantages of using an FSAM to perform field maintenance is that functionality normally controlled by CSAM 206 may be delegated to various FSAMs such that ASAMs may be maintained more efficiently in the field. Nevertheless, delegation of this authority comes with additional risk. To reduce the risk involved with allowing FSAMs to perform maintenance in the field, it is preferable to delimit the scope of maintenance that a single FSAM may perform. This limiting of scope may be performed in different ways.

Figure 11:
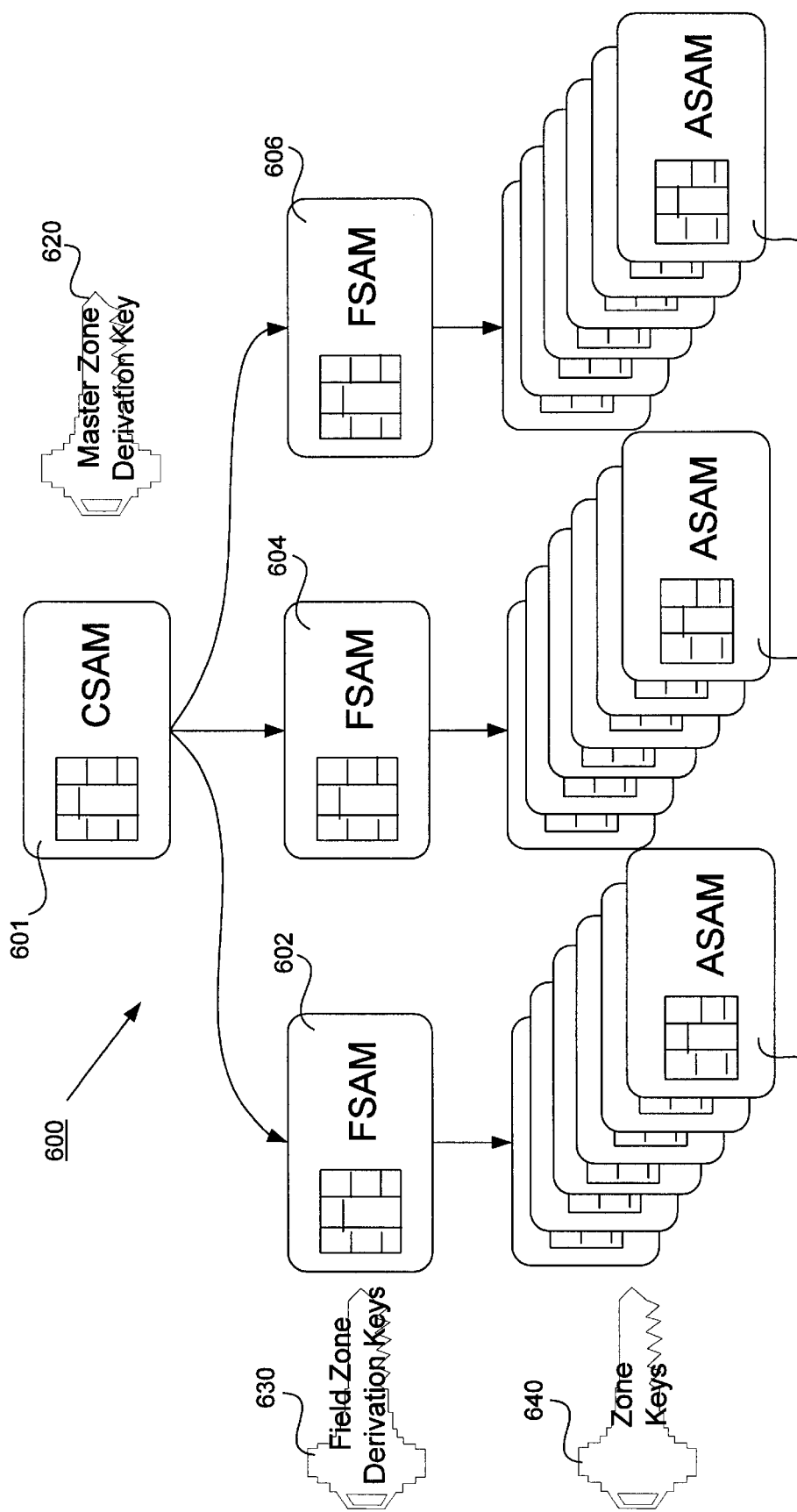
FIG. 11 illustrates a key hierarchy by which FSAMs perform maintenance on a subset of all ASAMs in the field.

By way of example, FIG. 11 illustrates a scenario 600 by which FSAMs are only able to perform maintenance on a subset of all ASAMs in the field. Scenario 600 illustrates CSAM 601 having created FSAMs 602–606. FSAM 602 is considered the parent of and is responsible for the maintenance of any number of ASAMs 610. In a similar fashion, FSAMs 604 and 606 are responsible for any number of ASAMs 612 and 614 respectively. Associated with CSAM 601 is a master zone derivation key 620 used for deriving zone keys for FSAMs and ASAMs. Using the appropriate FSAM identifier, master key 620 is used to derive the field zone keys 630, one per FSAM. Each FSAM field zone key in turn is used to derive the zone keys 640 for each ASAM of which it is the parent. For example, the ASAM identifier of each ASAM 610 is used in conjunction with the field zone key for FSAM 602 to derive the unique zone key for each ASAM 610. As previously described, this zone key is used for secure communication between one of the ASAMs 610 and FSAM 602. In a similar fashion, the field zone key for FSAM 602 is used for secure communication between FSAM 602 and CSAM 601. When AM 202 is creating a particular ASAM, it performs extra steps. It first assigns a particular ASAM to one FSAM. It then derives the FSAM zone key, and from that derives the appropriate ASAM zone key. In this fashion, CSAM 601 delegates authority for maintaining ASAMs in the field, but does so for each FSAM with a limited scope.

As an FSAM is now maintaining an ASAM in the field inside a card dispensing machine, it is preferable that a card dispensing machine include a subset of the software previously implemented on AM 202 to assist with maintenance of the ASAM. Alternatively, an FSAM may be a sophisticated processor card that includes all of the control logic and software for controlling maintenance of an ASAM.

SECURITY EMBODIMENT

Figure 12:
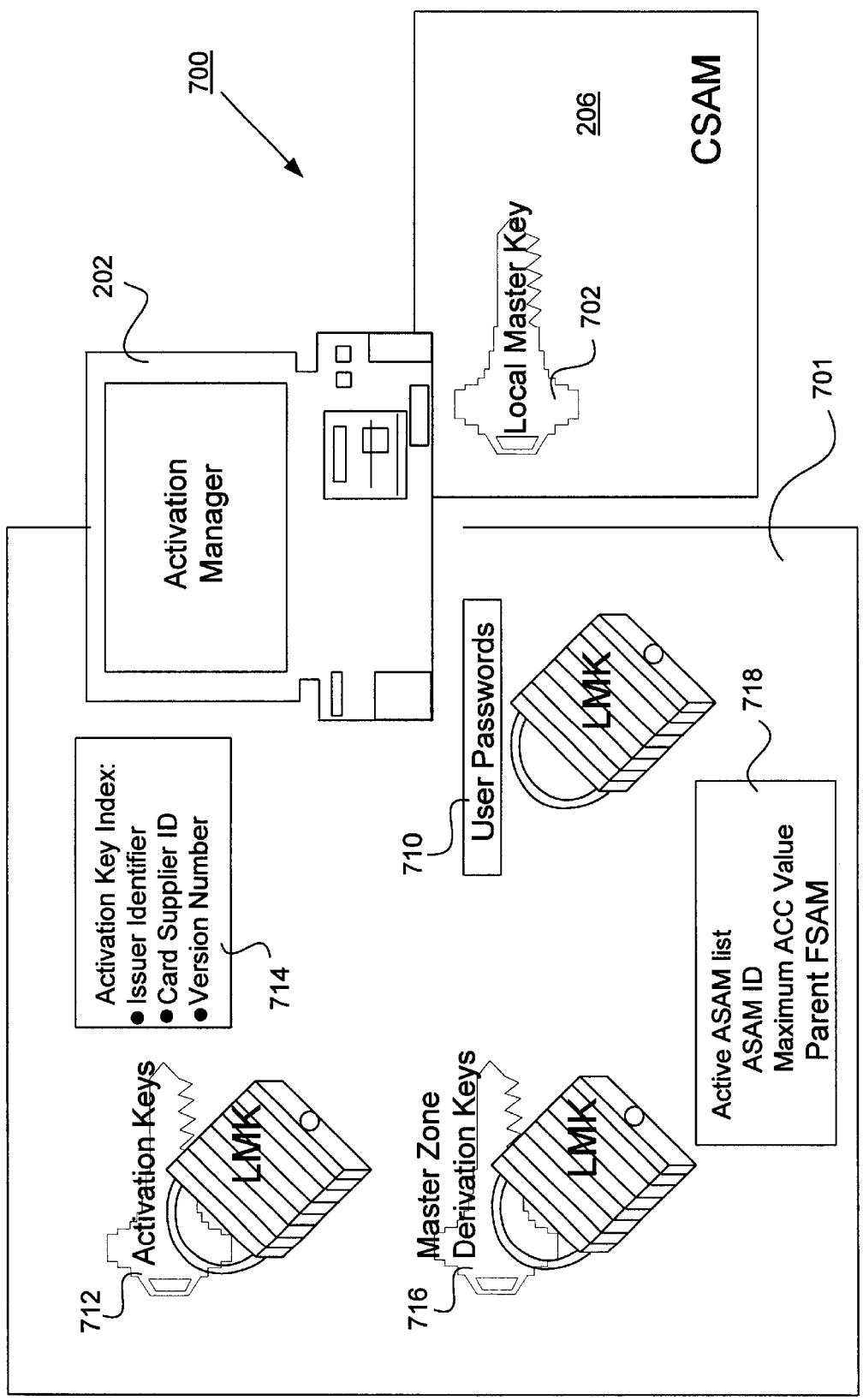
FIG. 12 presents one possible security embodiment illustrating the information contained within an activation manager (AM) and a CSAM.

FIG. 12 presents one possible security embodiment illustrating the information contained within AM 202 and CSAM 206. Scenario 700 illustrates activation manager 202 having associated information 701 and in communication with CSAM 206. Local master key (LMK) 702 is stored securely within CSAM 206 providing a secure location for this important key. As will be appreciated, CSAM 206 is a secure module or card with which it is necessary to create and maintain ASAMs and FSAMs.

As mentioned previously in FIG. 4, information 701 associated with activation manager 202 may be stored within CSAM 206 or in a secure database that is accessible only with authorization from CSAM 206, such as by using local master key 702. User passwords 710 are required for individuals wishing to use AM 202 to perform creation and maintenance. Activation keys 712 are stored in conjunction with an activation key index 714 that includes as indices the issuer identifier, the card supplier identifier and the activation key version number. Master zone derivation keys 716 are used to derive field zone keys for any number of FSAMs. There may be one master zone key, or there may be many. ASAM table 718 includes a list of all active ASAMs along with each ASAM identifier, its maximum permitted ACC value, and its associated parent FSAM. In this fashion, AM 202 has all relevant information at its disposal for the creation and maintenance of ASAMs and FSAMs.

COMPUTER SYSTEM EMBODIMENT

Figure 13:
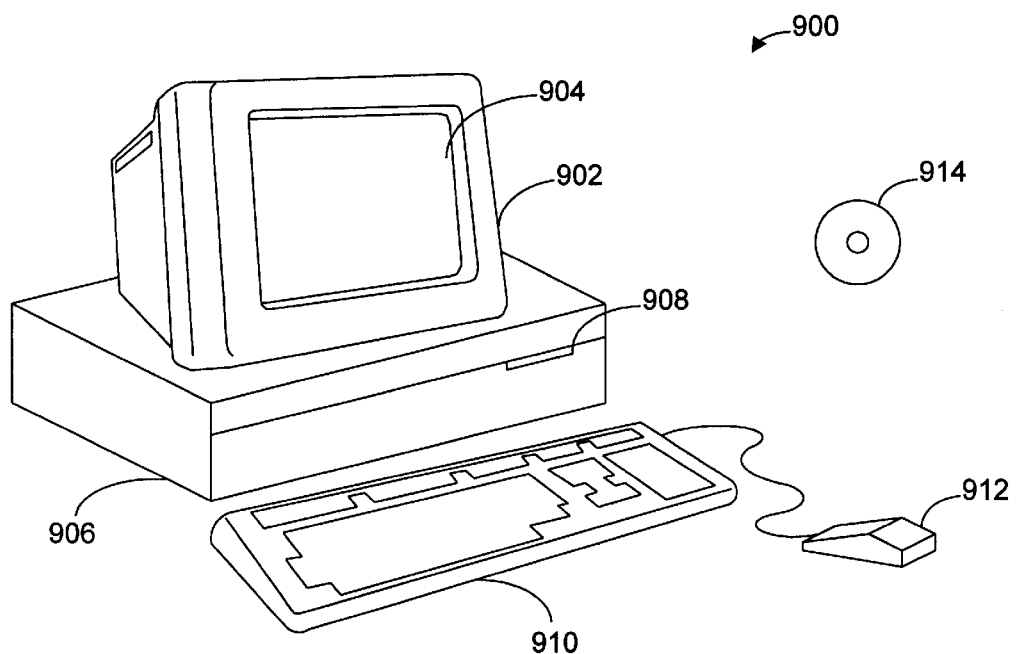
FIGS. 13 and 14 illustrate a computer system suitable for implementing embodiments of the present invention.
Figure 14:
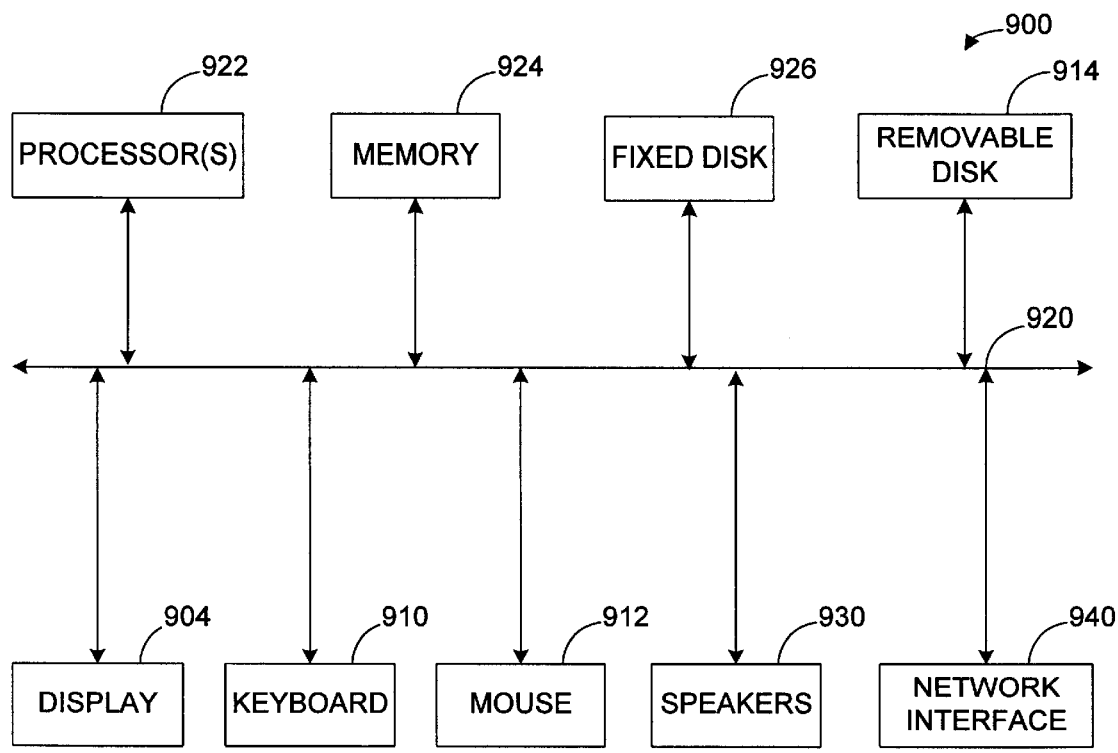

FIGS. 13 and 14 illustrate a computer system 900 suitable for implementing embodiments of the present invention. FIG. 13 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display Arcs 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the activation key can be used directly or in combination with other codes and/or encryption algorithms to provide a security code for a card. Any entity may perform the roles of supplier and/or issuer. Also, the card dispensing machine may form part of a larger machine, or may be functionally divided over a computer network. In addition, any suitable smart card capable of being placed into a security mode may be used. A security code may be generated by an ASAM during activation or by another secure hardware device, or also in software. A security code may even be allowed to be entered manually in order to activate a card. Therefore, the described embodiments should be taken as illustrative and not restrictive, and the invention should not be limited to the details given herein but should be defined by the following claims and their fuill scope of equivalents.

We claim:

1. A system for securely activating a stored value card at a point of distribution, said system comprising:
   a card dispensing machine that holds stored value cards from an issuer;
   a stored value card contained within said card dispensing machine, said stored value card including
      a stored value, and
      a card security code arranged to prevent access to said stored value on said card, said card security code being derived from an issuer key;
   a secure application module that includes
      said issuer key, and
      an encryption module used to derive said card security code from said issuer key;
   whereby said card dispensing machine is arranged to retrieve said card security code from said secure application module for presentation to said stored value card, said stored value card then being activated.

2. A system as recited in claim 1 wherein said secure application module is a smart card or a hardware security module.

3. A system as recited in claim 1 wherein said stored value card further includes unique information to said stored value card, and wherein said encryption module of said secure application module is arranged to derive said card security code from said issuer key and said unique information.

4. A method for securely activating a stored value card contained within a card olding device, said method comprising:
   determining whether said stored value card is in a security mode, said stored value card including a card security code;
   deriving said card security code using a secure application module and an issuer key;
   presenting said derived card security code to said stored value card;
   activating said stored value card such that value on said stored value card is available for use; and
   dispensing said stored value card from said card holding device.

5. A method as recited in claim 4 wherein said secure application module is a smart card or a hardware security module.

6. A method as recited in claim 4 further comprising:
   reading unique information from said stored value card; and
   deriving said card security code using said unique information and said issuer key.

7. A method as recited in claim 4 further comprising:
   determining whether an activation control counter of said secure application module has reached a limit; and
   wherein when it is determined that said activation control counter has reached said limit, aborting said method to activate said stored value card.

8. A system for securely activating stored value cards at a point of distribution, said system comprising:
   an issuer of stored value cards, said issuer producing a secret activation key;
   a card supplier that receives said secret activation key from said issuer, said card supplier deriving a plurality of card security codes based upon said secret activation key;
   a batch of stored value cards produced by said card supplier, each stored value card of said batch having written upon it one of said card security codes derived from said secret activation key, each stored value card further being placed in a security mode such that a value of each card is unavailable for use; and a secure application module that includes said secret activation key from said issuer, said secure application module being arranged to derive said card security codes using said secret activation key; and a card dispensing machine that stores said batch of stored value cards and includes said secure application module, said card dispensing machine being arranged to query said secure application module for one of said card security codes and to present said card security code to one of said stored value cards, whereby said stored value card is taken out of said security mode and is available for use.

9. A system as recited in claim 8 wherein said secure application module is a smart card or a hardware security module.

10. A system as recited in claim 8 wherein each stored value card further includes unique information, and wherein each card security code on each card is derived from said secret activation key and said unique information from each card.

11. A system for creating an activation secure module for activating stored value cards, each stored value card being unusable unless presented with a card security code, said system comprising:

a database that securely stores an activation key, said activation key being necessary for activating said stored value cards;

a control secure module arranged to securely access said activation key;

an activation secure module arranged to store securely said activation key, and including an encryption module for deriving said card security codes from said activation key;

an activation manager computer in communication with said database, said control secure module and said activation secure module, said activation manager computer being arranged to transfer said activation key from said database via said control secure module to said activation secure module, whereby said activation secure module is capable of producing said card security codes using said activation key.

12. A system as recited in claim 11 wherein said activation secure module is a smart card or a hardware security module.

13. A system as recited in claim 11 wherein said activation secure module further includes:

an activation control counter that limits the number of stored value cards that said activation secure module may activate.

14. A system as recited in claim 11 wherein said activation secure module further includes:

a zone key that allows secure communication between said activation secure module and said control secure module.

15. A method for creating an activation secure module useful for activating stored value cards, said stored value cards each requiring a card security code before their value is accessible, said method comprising:

placing an activation manager computer into communication with a control secure module and said activation secure module;

retrieving an activation key from a database using said control secure module, said activation key being necessary for activating said stored value cards;

loading encryption software into said activation secure module to allow said activation secure module to produce said card security codes using said activation key;

transferring said retrieved activation key to said activation secure module, whereby said activation secure module is capable of producing said card security codes using said activation key.

16. A method as recited in claim 15 further comprising:

loading a maximum value for an activation control counter into said activation secure module, said activation control counter limiting the number of stored value cards that said activation secure module may activate.

17. A method as recited in claim 15 further comprising:

loading a zone key into said activation secure module, said zone key allowing secure communication between said activation secure module and said control secure module.

18. A system for maintaining in the field an activation secure module useful for activating stored value cards, each stored value card being unusable unless presented with a card security code, said system comprising:

a field secure module storing an activation key, said activation key being necessary for activating said stored value cards;

an activation secure module arranged to store securely said activation key, and including an encryption module for deriving said card security codes from said activation key;

a card dispensing machine arranged for storing said stored value cards, said card dispensing machine including said activation secure module, said card dispensing machine being arranged to transfer said activation key from said field secure module to said activation secure module, whereby said activation secure module is capable of producing said card security codes using said activation key.

19. A system as recited in claim 18 wherein said field secure module is a smart card or a hardware security module.

20. A system as recited in claim 18 wherein said activation secure module further includes an activation control counter that limits the number of stored value cards that said activation secure module may activate, and wherein said field secure module includes a new maximum value with which to update said activation control counter of said activation secure module.

21. A system as recited in claim 18 further comprising:

a control secure module having a master zone key;

a plurality of field secure modules, said control secure module communicating with said field secure modules using field zone keys derived from said master zone key; and a plurality of sets of activation secure modules, each set of activation secure modules communicating with one of said field secure modules using a zone key derived from one of said field zone keys.

22. A method for maintaining in the field an activation secure module useful for activating stored value cards, said method comprising:

placing a plurality of stored value cards into a card dispensing machine, said stored value cards each requiring a card security code before their value is accessible, said card dispensing machine including an activation secure module;

placing a field secure module into communication with said card dispensing machine, said field secure module including an activation key necessary for activating said stored value cards;

retrieving said activation key from said field secure module; and transferring said retrieved activation key to said activation secure module, whereby said activation secure module is now able to produce said card security codes using said activation key.

23. A method as recited in claim 22 further comprising:

retrieving a new maximum value for an activation control counter from said field secure module; and resetting said activation control counter of said activation secure module using said retrieved new maximum value, said activation control counter limiting the number of stored value cards that said activation secure module may activate.

24. A method for maintaining in the field an activation secure module useful for activating stored value cards, said method comprising:

initiating a connection over a communications network between an activation computer having a control secure module and a card dispensing machine, said card dispensing machine including a plurality of stored value cards, said stored value cards each requiring a card security code before their value is accessible;

placing said control secure module into communication with an activation secure module of said card dispensing machine, said control secure module including an activation key necessary for activating said stored value cards;

retrieving said activation key from said control secure module; and transferring said retrieved activation key to said activation secure module over said communications network, whereby said activation secure module is now able to produce said card security codes using said activation key.

25. A method as recited in claim 24 further comprising:

retrieving a new maximum value for an activation control counter from said control secure module; and resetting said activation control counter of said activation secure module using said retrieved new maximum value, said activation control counter limiting the number of stored value cards that said activation secure module may activate.

* * * * *

UNITED STATES PATENT AND TRADEMARK OFFICE
CERTIFICATE OF CORRECTION

PATENT NO. : 6,298,336 B1
DATED : October 2, 2001
INVENTOR(S) : Davis et al.

It is certified that error appears in the above-identified patent and that said Letters Patent is hereby corrected as shown below:

Column 3,
Line 28, after plastic and before card, please delete ",".

Column 4,
Line 62, "Gr&D" should read -- G&D --.

Column 5,
Line 2, "networkl" should read -- network --.

Column 9,
Line 51, "divice" should read -- device --.

Column 10,
Line 40, "ae" should read -- an --.

Column 11,
Line 33, "fbr" should read -- for --.
Line 54, before 208, please delete ":".

Column 15,
Line 38, "unsuccessfiul" should read -- unsuccessful --.

Column 17,
Line 48, "diflerent" should read -- different --.

Column 19,
Line 12, after display and before 904, please delete "Arcs".
Line 66, "fuill" should read -- full --.

UNITED STATES PATENT AND TRADEMARK OFFICE
CERTIFICATE OF CORRECTION

PATENT NO. : 6,298,336 B1
DATED : October 2, 2001
INVENTOR(S) : Davis et al.

It is certified that error appears in the above-identified patent and that said Letters Patent is hereby corrected as shown below:

Column 20,
Line 30, "olding" should read -- holding --.

Signed and Sealed this

Twenty-third Day of April, 2002

Attest:

Attesting Officer

JAMES E. ROGAN
*Director of the United States Patent and Trademark Office*